United States Patent
Yamamoto et al.

(10) Patent No.: US 9,110,469 B2
(45) Date of Patent: Aug. 18, 2015

(54) SELF-PROPELLED WORK APPARATUS, METHOD, AND COMPUTER-READABLE MEDIUM

(71) Applicant: FUJI XEROX CO., LTD., Minato-ku, Tokyo (JP)

(72) Inventors: Susumu Yamamoto, Kanagawa (JP); Shigeru Yamamoto, Kanagawa (JP); Yasuharu Sakurai, Kanagawa (JP); Hirokazu Tsubota, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/104,619

(22) Filed: Dec. 12, 2013

(65) Prior Publication Data

US 2014/0365060 A1   Dec. 11, 2014

(30) Foreign Application Priority Data

Jun. 7, 2013   (JP) ................................. 2013-121246

(51) Int. Cl.
*G05D 1/02* (2006.01)
(52) U.S. Cl.
CPC ........................................ *G05D 1/02* (2013.01)
(58) Field of Classification Search
CPC ..................................................... G05D 1/02

USPC ............................................................ 701/23
See application file for complete search history.

(56) References Cited

U.S. PATENT DOCUMENTS

| | | | |
|---|---|---|---|
| 8,886,128 B2* | 11/2014 | Hubner et al. | 455/67.11 |
| 2006/0075230 A1* | 4/2006 | Baird et al. | 713/168 |
| 2008/0252920 A1* | 10/2008 | Koizumi et al. | 358/1.15 |
| 2009/0160694 A1* | 6/2009 | Di Flora | 341/176 |
| 2011/0205570 A1* | 8/2011 | Matsuda | 358/1.14 |
| 2012/0284184 A1* | 11/2012 | McGivney et al. | 705/43 |
| 2013/0038896 A1* | 2/2013 | Nalewajek | 358/1.15 |
| 2013/0297320 A1* | 11/2013 | Buser et al. | 704/275 |

FOREIGN PATENT DOCUMENTS

| | | |
|---|---|---|
| JP | 2002-86861 A | 3/2002 |
| JP | 2006-92361 A | 4/2006 |
| JP | 2012-64030 A | 3/2012 |

* cited by examiner

*Primary Examiner* — Mary Cheung
*Assistant Examiner* — Anne Mazzara
(74) *Attorney, Agent, or Firm* — Sughrue Mion, PLLC

(57) ABSTRACT

A self-propelled work apparatus includes a traveling unit, a work unit, and a user interface. The traveling unit moves in a self-propelled manner to a position near a user. The work unit performs predetermined work. The user interface adjusts a position of the traveling unit located near the user, in accordance with a motion of the user. The work unit starts the predetermined work when the user interface is activated in accordance with the user motion.

17 Claims, 18 Drawing Sheets

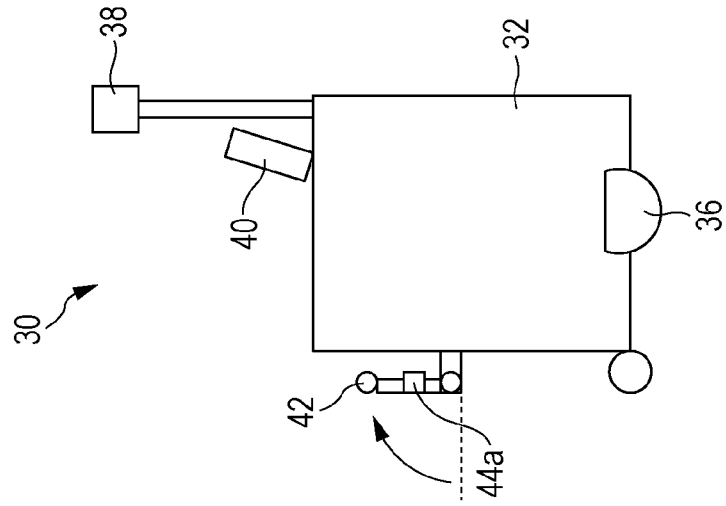
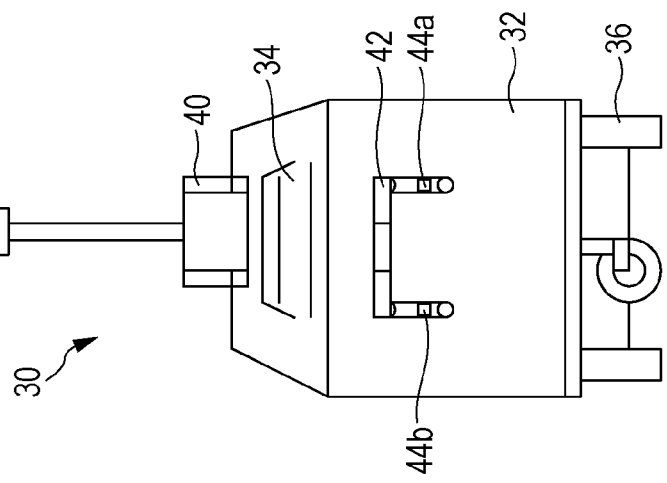

SELF-PROPELLED WORK APPARATUS, METHOD, AND COMPUTER-READABLE MEDIUM

CROSS-REFERENCE TO RELATED APPLICATIONS

This application is based on and claims priority under 35 USC 119 from Japanese Patent Application No. 2013-121246 filed Jun. 7, 2013.

BACKGROUND (i) Technical Field

The present invention relates to a self-propelled work apparatus, a method, and a computer-readable medium.

(ii) Related Art

Self-propelled image forming apparatuses are known.

SUMMARY

According to an aspect of the present invention, there is provided a self-propelled work apparatus including a traveling unit, a work unit, and a user interface. The traveling unit moves in a self-propelled manner to a position near a user. The work unit performs predetermined work. The user interface adjusts a position of the traveling unit located near the user, in accordance with a motion of the user. The work unit starts the predetermined work when the user interface is activated in accordance with the user motion.

BRIEF DESCRIPTION OF THE DRAWINGS

Exemplary embodiments of the present invention will be described in detail based on the following figures, wherein:

FIGS. 6A and 6B are diagrams illustrating exemplary appearances of a self-propelled image forming apparatus according to the exemplary embodiment;

DETAILED DESCRIPTION

Exemplary embodiments of the present invention will be described below on the basis of the drawings. A self-propelled image forming apparatus is taken as an exemplary self-propelled work apparatus, and a case in which a self-propelled image forming apparatus is used in a cafe will be described. However, the present invention is not limited to this example.

Figure 1:
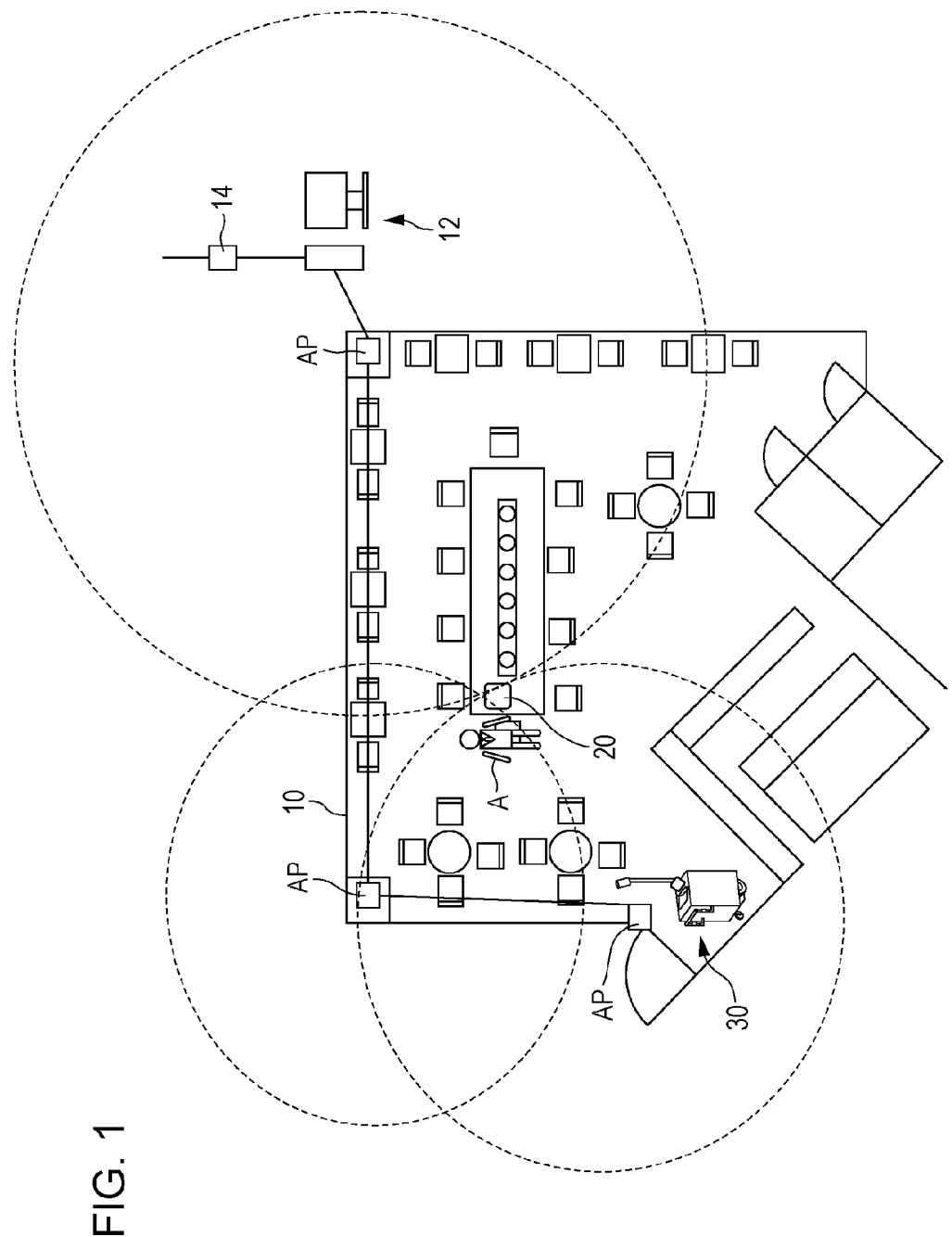
FIG. 1 is a diagram illustrating an exemplary layout in a building.

FIG. 1 illustrates an exemplary cafe 10. In the cafe 10, there are various furnishings, such as tables, chairs, a cash register, a tray return station, and a food delivery counter. In the cafe 10, access points AP, a communication control apparatus 12, a router 14 for external connection, and the like are installed, and provide an Internet connection by using a communication system, such as wireless fidelity (WiFi) or 3G/4G.

For example, a user A enters the cafe 10, and operates a portable terminal 20 such as a mobile device, thereby establishing a connection to the Internet. In the cafe 10, for example, at least three access points AP are installed, and each of the access points AP detects the intensity of a radio wave (a circle drawn by using a dashed line illustrated in FIG. 1). The communication control apparatus 12 receives a signal from each of the access points AP, and estimates the position of the portable terminal 20 on the basis of the signals transmitted from the three or more access points AP. In the example illustrated in FIG. 1, the communication control apparatus 12 presumes that the portable terminal 20 is located at the position at which the three circles meet. For example, the user A operates the portable terminal 20 to do work, and gives an instruction to execute a print job. In this case, a self-propelled image forming apparatus 30 searches for a route from the starting position to the position of the portable terminal 20 (user A), i.e., a destination, and moves by itself to a position near the portable terminal 20 (user A) along the route obtained through the searching, so as to execute the print job. The route is retrieved by using a known method. An example in which an instruction to execute a print job is given from the portable terminal 20, and in which the self-propelled image forming apparatus 30 executes the print job will be described below. However, the present invention is not limited to execution of a print job.

Figure 2:
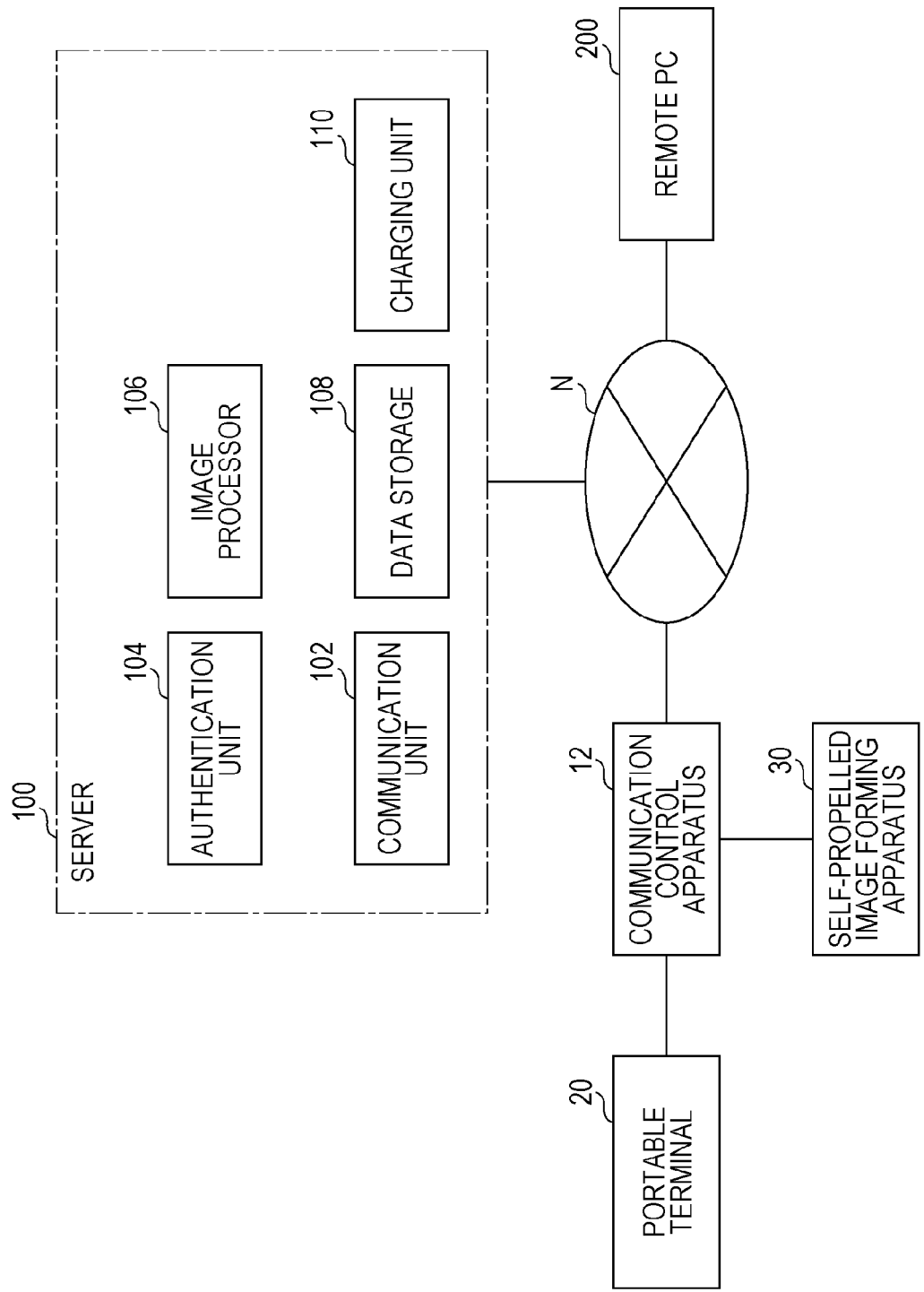
FIG. 2 is a diagram illustrating an exemplary system according to an exemplary embodiment.

FIG. 2 illustrates an exemplary system according to an exemplary embodiment of the present invention. The communication control apparatus 12, a remote PC 200, and a server 100 are connected to a network N serving as a communication path. This constitutes, for example, cloud computing. More than one remote PC 200 and more than one server 100 may be connected to the network N. In FIG. 2, the access points AP and the router 14 are not illustrated.

The communication control apparatus 12 communicates with the portable terminal 20 and the self-propelled image forming apparatus 30 via the access points AP, and communicates with the remote PC 200 and the server 100 via the router 14 and the network N. As described above, the communication control apparatus 12 estimates the position of the portable terminal 20 on the basis of the signals from the access points AP.

The portable terminal 20 accesses the remote PC 200 and the server 100 which are located outside, via the communication control apparatus 12. Identification information specific to a device, such as a media access control (MAC) address which is a physical address, is assigned to the network hardware of the portable terminal 20. The information such as a MAC address allows the portable terminal 20 to be uniquely specified. An Internet Protocol (IP) address as a logical address is assigned to the portable terminal 20, for example, by a dynamic host configuration protocol (DHCP) server, allowing, for example, packet communication.

For example, when the user A gives an instruction to execute a print job, by using the portable terminal 20, the portable terminal 20 transmits control information indicating the print job, and the MAC address of the portable terminal 20 to the communication control apparatus 12. The communication control apparatus 12 transmits the control information and the MAC address via the network N to the server 100.

For example, the self-propelled image forming apparatus 30 has a print function of printing received data and a traveling function. For example, when the portable terminal 20 gives an instruction to execute a print job, the communication control apparatus 12 receives data to be printed, from the server 100, and transmits the data to be printed, a control signal indicating the print job, and the position information of the portable terminal 20, to the self-propelled image forming apparatus 30.

The remote PC 200, which is, for example, a computer installed in an office or the like, stores document data, image data, and the like.

The server 100 includes a communication unit 102, an authentication unit 104, an image processor 106, a data storage 108, and a charging unit 110.

The communication unit 102, which is, for example, a network interface, transmits/receives data via the network N. The image processor 106 subjects document data, image data, and the like to image processing. The data storage 108 is a device which stores document data, image data, and the like which are transmitted from, for example, the portable terminal 20 or the remote PC 200. The charging unit 110 performs charging when a process such as printing is chargeable.

The authentication unit 104 authenticates a user. For example, the MAC address of the portable terminal 20 is associated in advance with authentication information (registered authentication information) used to specify a user, and the association is stored in a memory (not illustrated). The authentication unit 104 checks authentication information transmitted from the communication control apparatus 12 against the registered authentication information, thereby performing authentication. Examples of the authentication information include a user name, a user ID, a password, and biological information of a user. Examples of the biological information include a vein pattern, a fingerprint, a voice, the face, and an appearance of a user. The MAC address and the registered authentication information may be registered in advance, for example, when a user enters the cafe 10. Detailed processes performed by the authentication unit 104 and the charging unit 110 will be described below.

The server 100 includes a processor (not illustrated) such as a central processing unit (CPU), and the functions of the units included in the server 100 are achieved with the processor executing programs.

Figure 3:
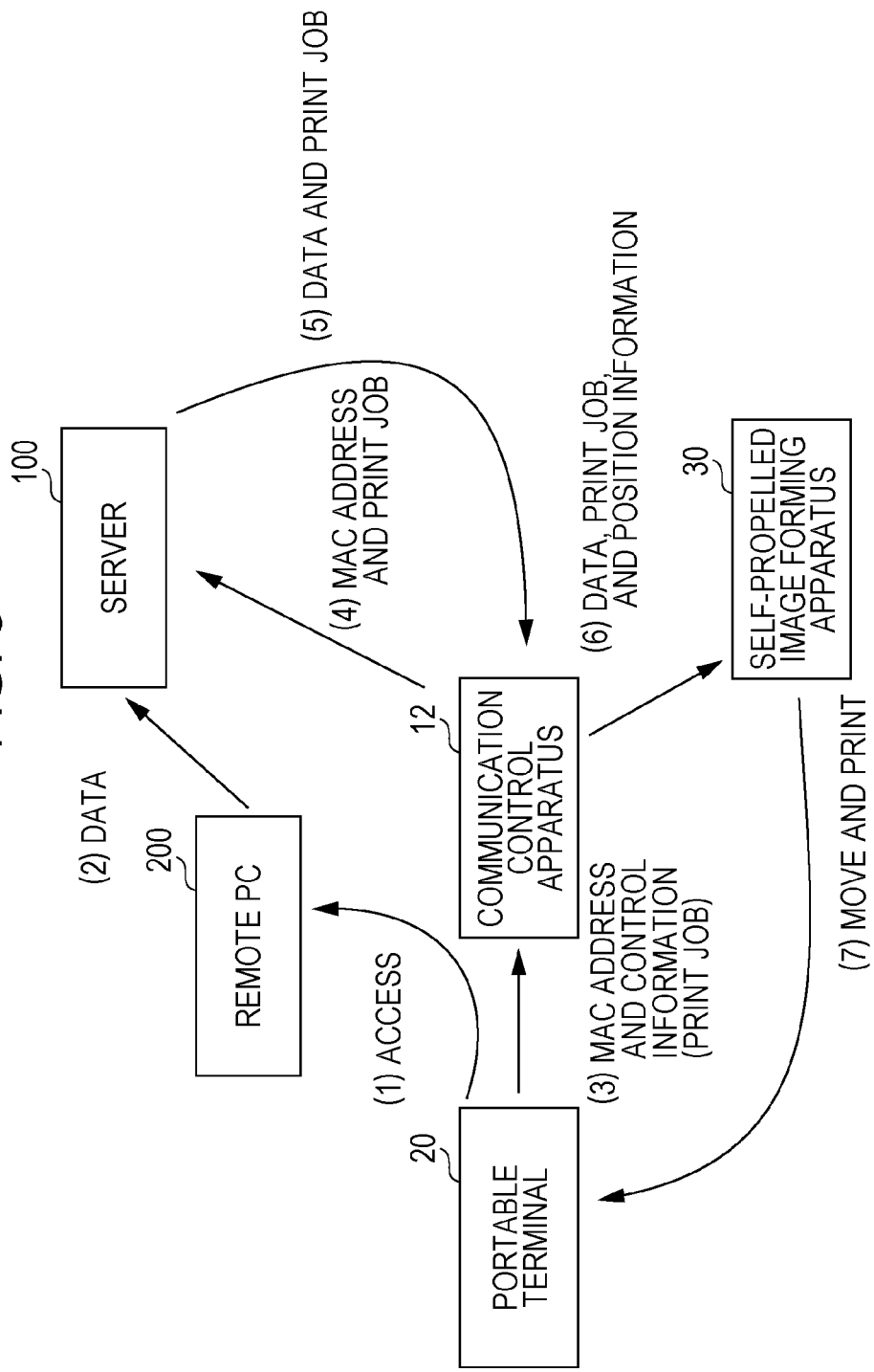
FIG. 3 is a schematic diagram illustrating operations of the system according to the exemplary embodiment.

Schematic operations of the entire system will be described with reference to FIG. 3. For example, a case in which data stored in the remote PC 200 is to be printed will be described.

The user A operates the portable terminal 20 so as to log into the remote PC 200 located outside, and specifies data which is to be printed and which is stored in the remote PC 200 (in operation 1). The user A operates the portable terminal 20 so as to specify the data storage destination, e.g., a uniform resource locator (URL), and stores the data to be printed, in the storage destination (in operation 2). For example, the data to be printed is stored in the data storage 108 of the server 100. Alternatively, data stored in the portable terminal 20 may be printed. In this case, the user A operates the portable terminal 20 so as to specify data to be printed, from the data stored in the portable terminal 20. The portable terminal 20 transmits data to be printed, via the communication control apparatus 12 and the network N to the server 100. The data to be printed is stored in the specified storage destination.

When the user A gives an instruction to execute a print job, by using the portable terminal 20, the portable terminal 20 transmits control information indicating the print job, and the MAC address to the communication control apparatus 12 (in operation 3). The communication control apparatus 12 transmits the control signal and the MAC address via the network N to the server 100 (in operation 4). The authentication unit 104 of the server 100 may specify the portable terminal 20 which has transmitted the instruction to execute a print job, by means of the MAC address, and may authenticate the user A by using the registered authentication information associated with the MAC address.

The image processor 106 of the server 100 subjects the data to be printed, to image processing, thereby generating print data such as a Portable Document Format (PDF) file. The communication unit 102 of the server 100 transmits the data to be printed, and control information indicating the print job, to the communication control apparatus 12 in the cafe 10 in which the MAC address of the portable terminal 20 has been detected (in operation 5).

The communication control apparatus 12 transmits the position information indicating the position of the portable terminal 20 (user A), the data to be printed, and the control information indicating the print job, to the self-propelled image forming apparatus 30 (in operation 6).

The self-propelled image forming apparatus 30 searches for a route from the starting position to the portable terminal 20 on the basis of the position information of the portable terminal 20, and moves by itself to a position near the portable terminal 20 (user A) along the route obtained through the searching, so as to execute the print job (in operation 7). The charging unit 110 of the server 100 may perform charging after or before execution of the print job.

Figure 4:
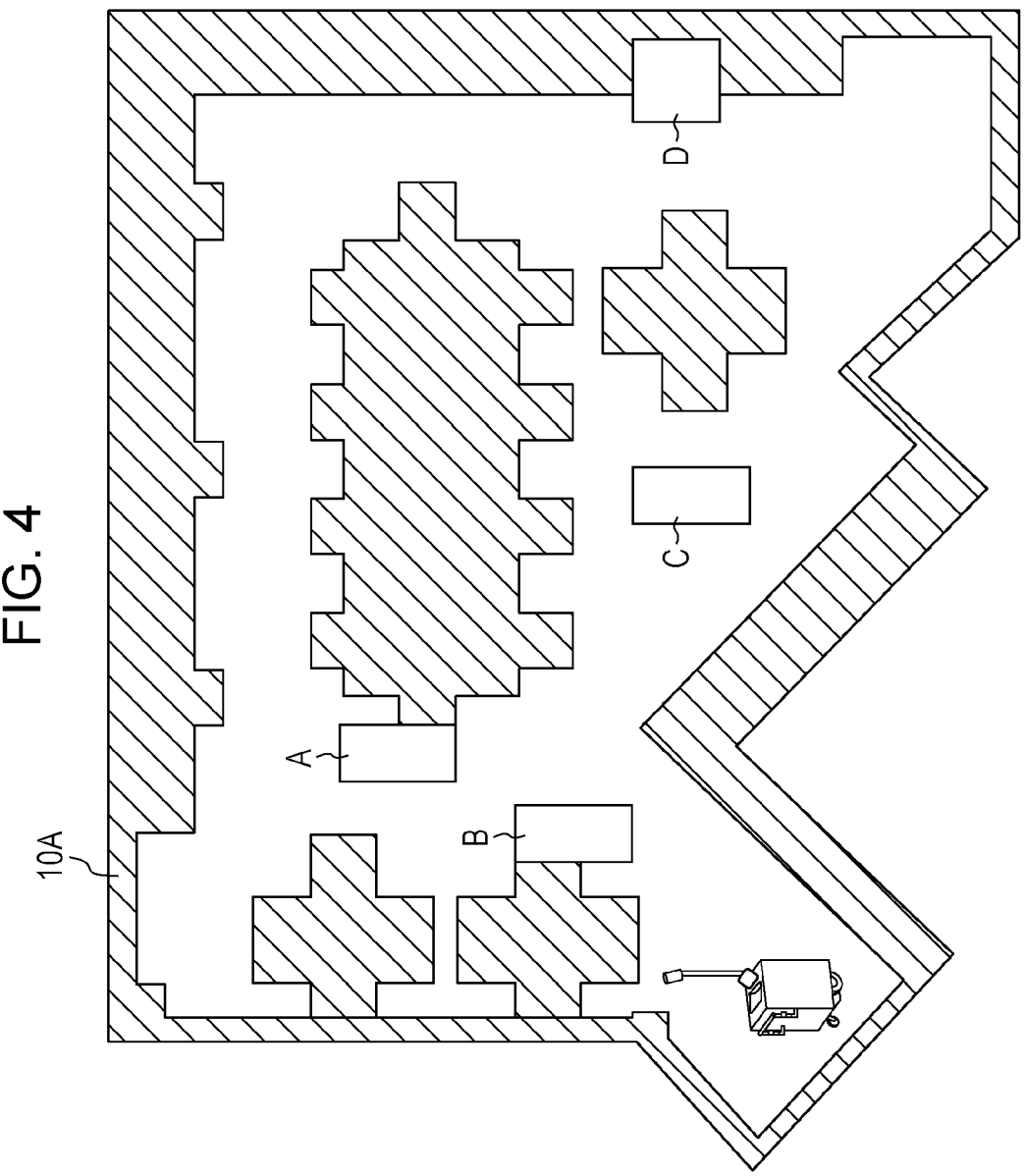
FIG. 4 is a diagram illustrating an exemplary map in the building.
Figure 5:
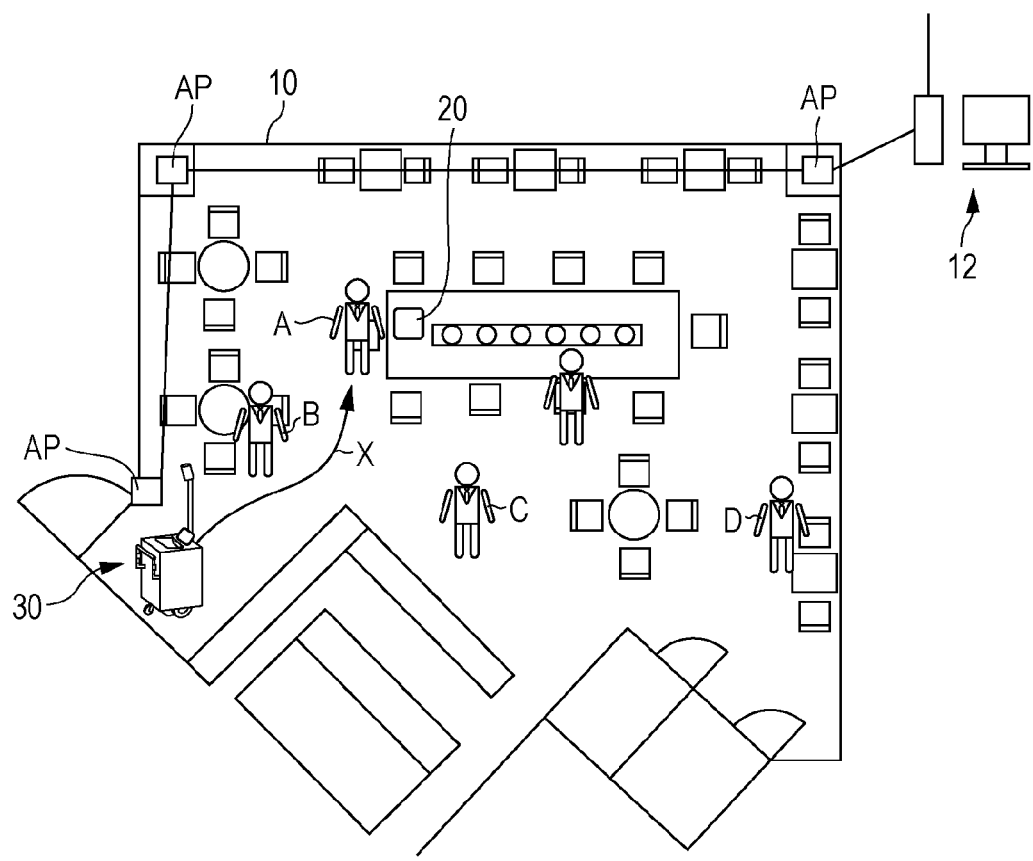
FIG. 5 is a diagram for describing a travel route in the building.

For example, the self-propelled image forming apparatus 30 obtains and stores an initial map of the inside of the cafe 10 which is obtained by using a sensor. The initial map is generated in advance by using the sensor, and describes the positions of the walls, tables, chairs, furniture, and the like in the cafe 10. The self-propelled image forming apparatus 30 also obtains a measured map 10A illustrated in FIG. 4, by using the sensor while the self-propelled image forming apparatus 30 is moving. For example, the measured map 10A includes information indicating temporary obstacles such as the user A and users B to D. The self-propelled image forming apparatus 30 compares the initial map with the measured map 10A, and determines a travel route X to the portable terminal 20 of the user A on the basis of the position information indicating the position of the portable terminal 20, as illustrated in FIG. 5. The self-propelled image forming apparatus 30 may determine the travel route X by using the position of the chair on which the user A is sitting, as a goal. The position of the chair on which the user A is sitting may be specified on the basis of the initial map. The self-propelled image forming apparatus 30 moves by itself to a position near the user A (near the portable terminal 20 of the user A) along the travel route X, and executes the print job.

The structure of the self-propelled image forming apparatus 30 will be described. FIGS. 6A and 6B illustrate appearances of the self-propelled image forming apparatus 30. FIG. 6A is a front view of the self-propelled image forming apparatus 30, and FIG. 6B is a side view of the self-propelled image forming apparatus 30.

A medium storage 34 is disposed on the top surface of a housing 32 of the self-propelled image forming apparatus 30. The medium storage 34 stores a recording medium on which an image is formed by an image forming unit in the housing 32 and which is ejected. A traveling device 36 is disposed in a lower portion of the housing 32. The traveling device 36 includes a drive unit, wheels, a power source, and a drive controller which are used to move in a self-propelled manner. A sensor 38 is disposed in an upper portion of the housing 32. The sensor 38, which is, for example, a camera, an infrared sensor, an ultrasonic wave sensor, or a laser range finder (LRF), detects the distance from the self-propelled image forming apparatus 30 to a surrounding object, or detects obstacles. A sensor may be disposed in a lower portion of the housing 32, and the sensor disposed in a lower portion may be used to detect obstacles or the like located at lower positions with respect to the housing 32. An operation unit 40 displays information, and receives user operations. A map describing the inside of the cafe 10 may be generated on the basis of information about obstacles and the like which are detected by a sensor installed in the cafe 10.

A handle 42 is disposed on the front of the housing 32. The handle 42 faces in the same direction as the facing direction of the medium storage 34 and the operation unit 40, and is fixed at a position lower than the medium storage 34 so that, for example, a user who is sitting on a chair may easily operate the self-propelled image forming apparatus 30. As illustrated in FIG. 6B, the handle 42 has a structure which allows the handle 42 to be held at multiple angles. For example, the handle 42 is held at an angle such that the handle 42 is oriented substantially parallel to the housing 32 during standby or in the traveling mode. The handle 42 corresponds to an exemplary user interface for moving the self-propelled image forming apparatus 30 toward a user in accordance with a user motion.

Pressure sensors, i.e., a left pressure sensor 44a and a right pressure sensor 44b, are attached to the left and right sides of the handle 42. The left pressure sensor 44a and the right pressure sensor 44b detect a force in the horizontal direction (X and Y directions) produced when a user holds and operates the handle 42. The drive unit of the traveling device 36 is controlled on the basis of the detection result, whereby the left and right wheels are independently driven and controlled. The left pressure sensor 44a and the right pressure sensor 44b correspond to an exemplary detection unit for detecting an operation using the handle performed by a user.

Figure 7:
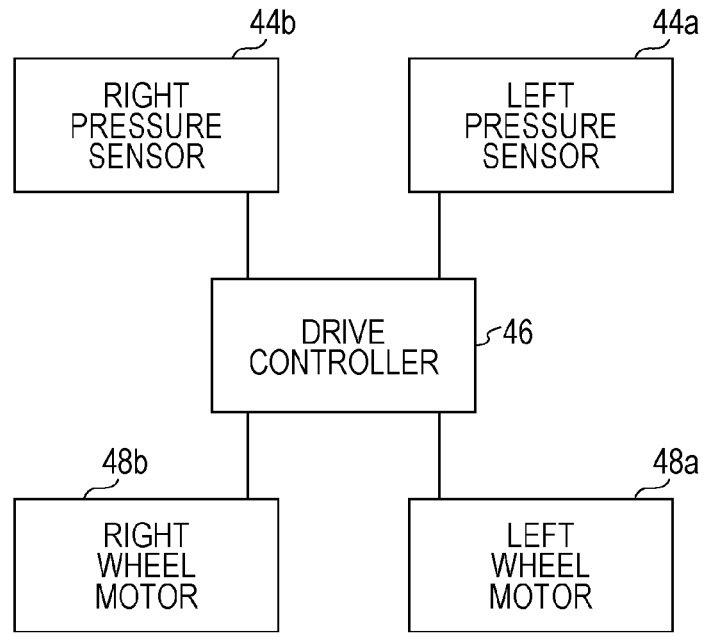
FIG. 7 is a diagram illustrating a configuration for performing traveling control of the self-propelled image forming apparatus according to the exemplary embodiment.

FIG. 7 illustrates the configuration for controlling the traveling device 36 by means of operations using the handle 42. The left pressure sensor 44a and the right pressure sensor 44b converts a change in electric resistance which is produced through a piezoresistance effect occurring due to a force from the outside, into an electric signal, and outputs the electric signal to a drive controller 46. The drive controller 46 includes a CPU, a memory, and a driver unit for driving a motor. The drive controller 46 combines a signal from the left pressure sensor 44a and a signal from the right pressure sensor 44b, and obtains a traveling direction vector (X and Y directions) of the traveling device 36 as a value. The drive controller 46 determines rotation directions and torques for a left wheel motor 48a and a right wheel motor 48b which drive the left wheel and the right wheel, respectively, on the basis of the obtained value, and controls driving of the left wheel motor 48a and the right wheel motor 48b.

Figure 8:
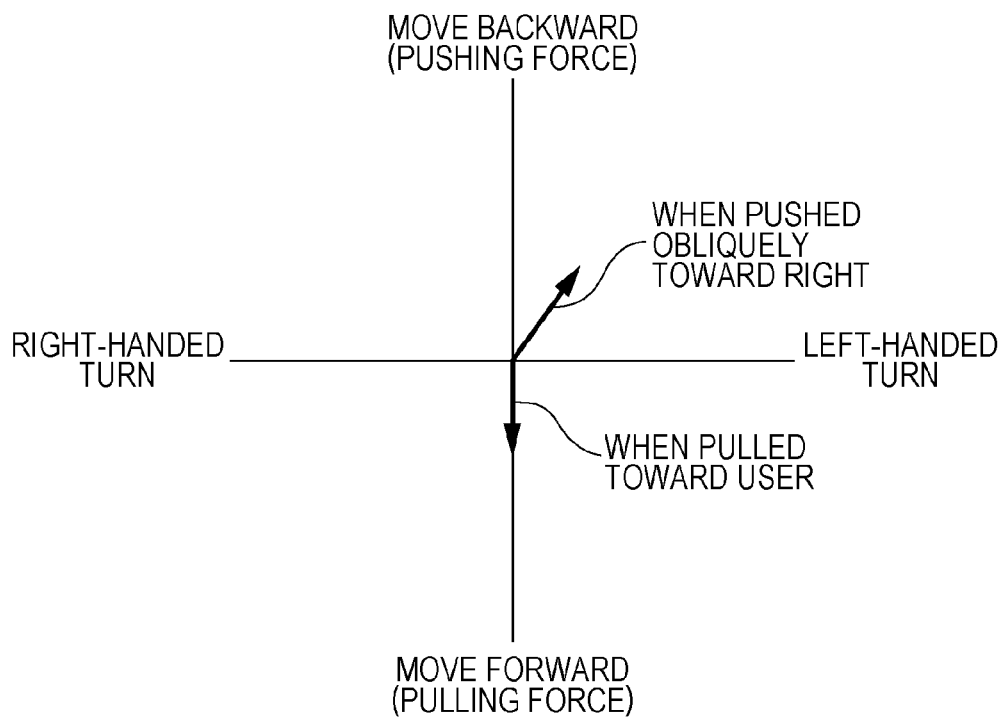
FIG. 8 is a diagram for describing a traveling direction of the self-propelled image forming apparatus.
Figure 9:
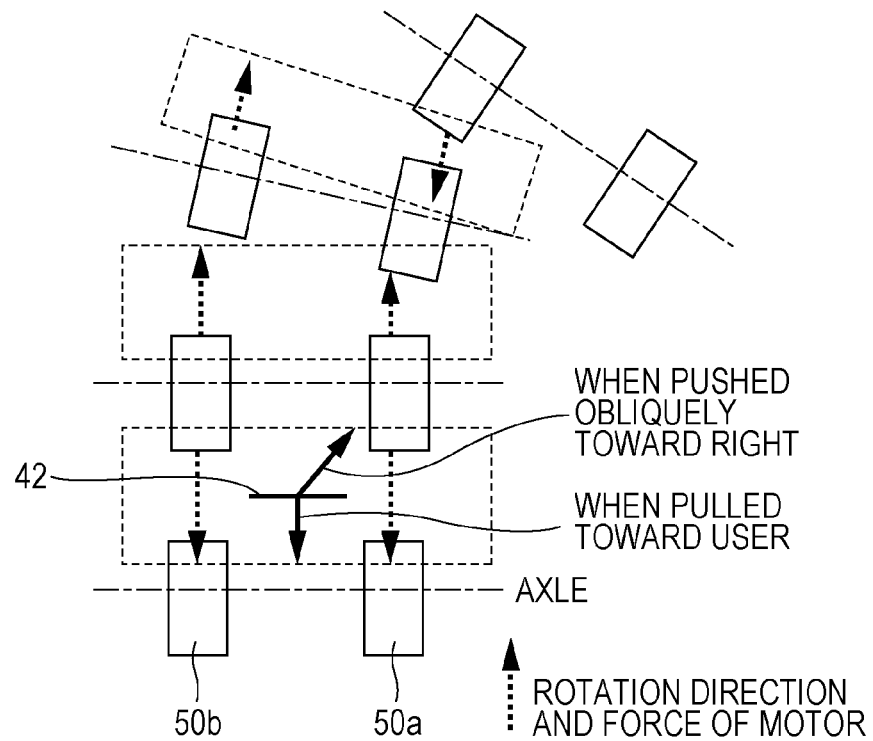
FIG. 9 is a diagram for describing a traveling direction of the self-propelled image forming apparatus.

Movements of the self-propelled image forming apparatus 30 will be described with reference to FIGS. 8 and 9. FIG. 8 illustrates the direction and the strength of a force applied to the handle 42. FIG. 9 schematically illustrates movements of the self-propelled image forming apparatus 30. For example, when a user pulls the handle 42 straightly forward (toward the user), the drive controller 46 makes a left wheel 50a and a right wheel 50b move forward by using the same torque. When a user pushes the handle 42 obliquely toward right, the drive controller 46 makes the left wheel 50a and the right wheel 50b move backward in such a manner that a torque for the left wheel 50a is smaller than that for the right wheel 50b. Thus, the self-propelled image forming apparatus 30 makes a left-handed turn while moving backward, due to the difference between the torques on the left side and the right side. The drive controller 46 makes the left wheel 50a and the right wheel 50b rotate in the opposite direction, whereby the self-propelled image forming apparatus 30 turns along a small circle.

The configuration of the self-propelled image forming apparatus 30 illustrated in FIGS. 6A to 7 is an example, and another configuration having an alternative to wheels may be employed as the traveling device 36.

Figure 10:
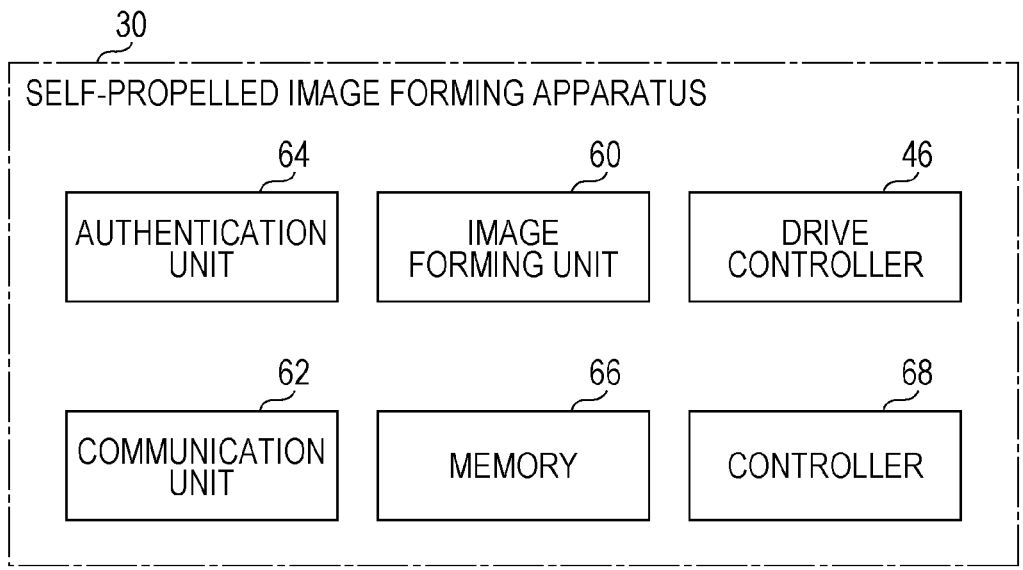
FIG. 10 is a block diagram illustrating exemplary functions of the self-propelled image forming apparatus according to the exemplary embodiment.

FIG. 10 illustrates a functional block diagram of the self-propelled image forming apparatus 30. The self-propelled image forming apparatus 30 includes a drive controller 46, an image forming unit 60, a communication unit 62, an authentication unit 64, a memory 66, and a controller 68.

The image forming unit 60 is provided with a print function of printing data. The image forming unit 60 may be provided with general functions of an image forming apparatus, such as a copy function and a facsimile function, as well as a print function. The image forming unit 60 may perform image processing such as conversion of image data.

The communication unit 62 communicates with the communication control apparatus 12 illustrated in, for example, FIG. 1, via the access points AP.

The authentication unit 64 performs authentication. The authentication unit 64 uses near field communication, such as Bluetooth™ (hereinafter, referred to as "BT") or Near Field Communication (hereinafter, referred to as "NFC"), to communicate with other communication devices, and authenticates a user (communication device). Other communication devices include the portable terminal 20 and a mobile device which is used by a user and which is a communication device other than the portable terminal 20.

For example, a case in which BT is used will be described. For example, the authentication unit 64 uses proximity pairing to establish a connection with a communication device which is present at a position closest to the self-propelled image forming apparatus 30. Specifically, the authentication unit 64 makes an inquiry and an inquiry response between the authentication unit 64 and the communication device. At that time, when multiple communication devices are present in the cafe 10, the authentication unit 64 detects a radio wave from each of the communication devices, and determines a communication device from which the authentication unit 64 receives the largest signal, to be the communication device of the user who has given the instruction to execute a print job. The authentication unit 64 establishes a connection with the communication device in a mode in which a PIN number is not necessary (e.g., BT 2.1 simple secure pairing).

The memory 66 stores map information, such as the initial map and the measured map.

The controller 68 controls the units included in the self-propelled image forming apparatus 30. For example, after a user is authenticated, when an operation using the handle 42 performed by the user is detected, the controller 68 instructs the image forming unit 60 to start printing. The controller 68 detects a handle operation performed by a user, on the basis of a detection result from the left pressure sensor 44a and the right pressure sensor 44b. In addition to the above-described control, the controller 68 may obtain a route from the starting position of the self-propelled image forming apparatus 30 to the destination.

The self-propelled image forming apparatus 30 includes a processor such as a CPU (not illustrated). The processor executes programs, whereby the functions of the units illustrated in FIG. 10 are achieved.

First Exemplary Embodiment

A first exemplary embodiment will be described with reference to FIGS. 11 to 13. In the first exemplary embodiment, BT as an example of near field communication is used to perform authentication, and a print job is executed.

Figure 11:
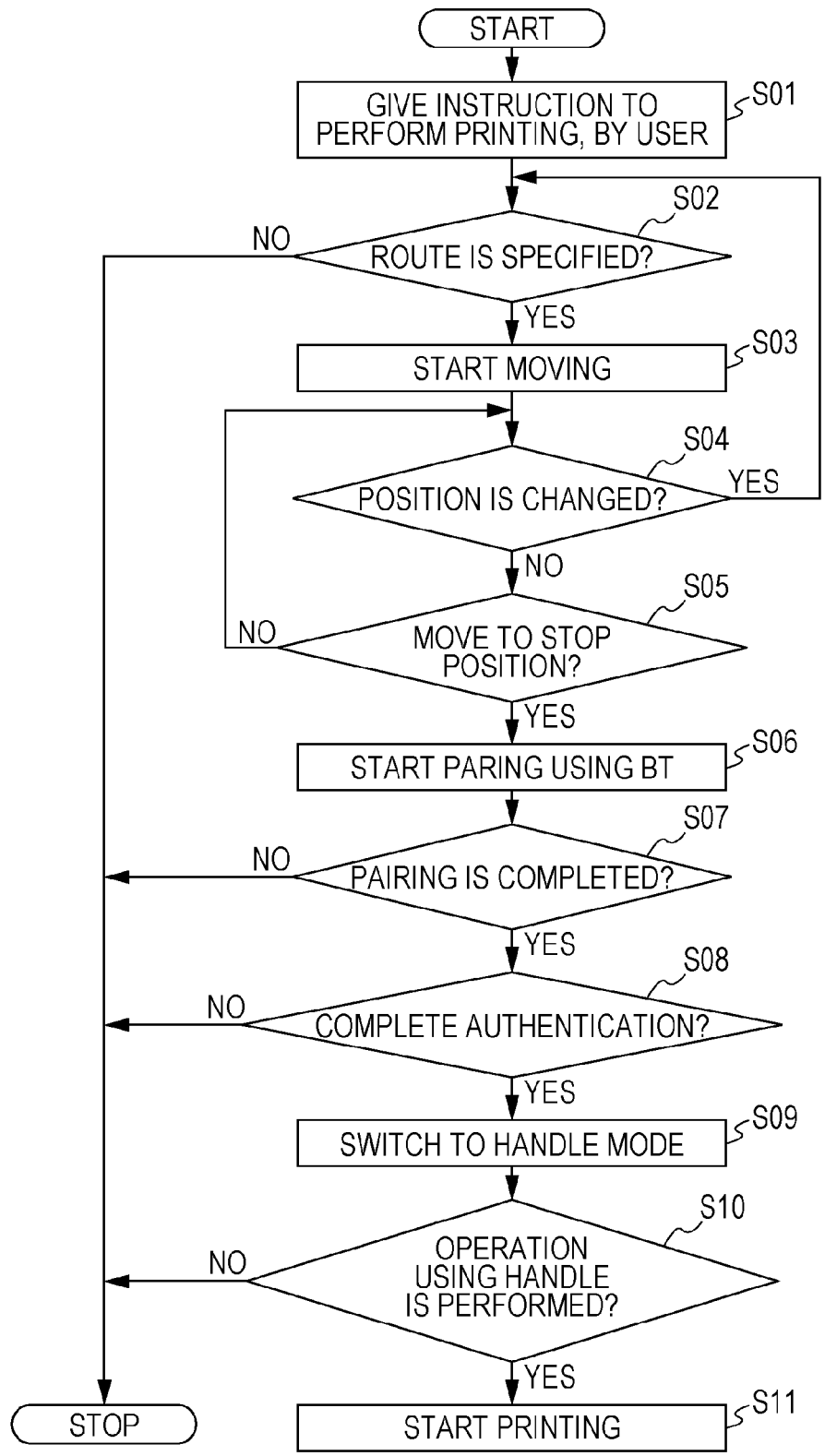
FIG. 11 is a flowchart of an exemplary operation of the system according to a first exemplary embodiment.
Figure 12:
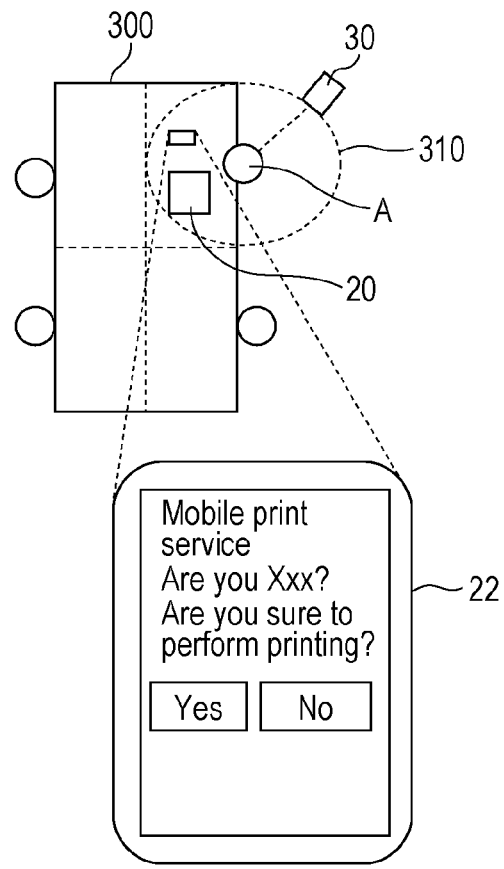
FIG. 12 is a diagram illustrating an exemplary screen or the like displayed on a portable terminal.

Referring to the flowchart in FIG. 11, the user A specifies data to be printed, by using the portable terminal 20, and gives an instruction to perform a print job (in step S01). For example, as illustrated in FIG. 12, the user A sits on a chair at a table 300 for four persons, and specifies a print job by using the portable terminal 20. Thus, as described with reference to FIG. 3, the position information indicating the position of the portable terminal 20, the data to be printed, and control information indicating the print job are transmitted to the self-propelled image forming apparatus 30.

The controller 68 of the self-propelled image forming apparatus 30 changes the mode of the self-propelled image forming apparatus 30 to the traveling mode. The controller 68 searches for a route from the starting position to the portable terminal 20 on the basis of the position information of the portable terminal 20. If the route is specified (Yes in step S02), the self-propelled image forming apparatus 30 starts moving (in step S03). If a route is not specified (No in step S02), the controller 68 stops the process. The self-propelled image forming apparatus 30 continues to receive the position information of the portable terminal 20 from the communication control apparatus 12. If the position of the portable terminal 20 (user A) is not changed (No in step S04), the self-propelled image forming apparatus 30 moves to a position close to the portable terminal 20 (user A), i.e., a stop position. For example, as illustrated in FIG. 12, the self-propelled image forming apparatus 30 moves to a position near the portable terminal 20 (user A), and stops with the handle 42, which is illustrated in FIGS. 6A and 6B, being tilted toward the user A. For example, the self-propelled image forming apparatus 30 approaches the portable terminal 20 or moves to a position on the periphery of an area (a circle 310 in FIG. 12) predetermined by using the position of the chair on which the user A is sitting, as the center, and stops. If the position of the portable terminal 20 has been changed (Yes in step S04), the self-propelled image forming apparatus 30 searches for a route to the portable terminal 20, and performs step S02 and its subsequent steps.

If the self-propelled image forming apparatus 30 moves to the stop position (Yes in step S05), the authentication unit 64 starts proximity pairing using BT (in step S06). If the pairing is completed (Yes in step S07), the authentication unit 64 establishes a connection with a communication device from which the self-propelled image forming apparatus 30 receives the largest signal, and authenticates the user (in step S08). For example, the authentication unit 64 establishes a connection with the portable terminal 20 or a second mobile device of the user, and authenticates the user. At that time, a communication device from which the self-propelled image forming apparatus 30 receives the largest signal is assumed to be a device for the user A. For example, the controller 68 of the self-propelled image forming apparatus 30 uses BT to notify the portable terminal 20 or the second mobile device, from which the self-propelled image forming apparatus 30 receives the largest signal, of provision of the service. In the case where a program for providing a service is installed in advance in the portable terminal 20 or the second mobile device, when the portable terminal 20 or the second mobile device receives the notification of provision of a service, from the self-propelled image forming apparatus 30 through BT, the portable terminal 20 or the second mobile device displays a screen 22 for authentication, for example, as illustrated in FIG. 12. When the user A selects "Yes" or "No", the portable terminal 20 or the second mobile device transmits the selection result to the self-propelled image forming apparatus 30 through BT. If the user A selects "Yes", the authentication unit 64 completes the authentication (Yes in step S08). If the user A selects "No", the authentication fails (No in step S08), and the controller 68 stops the process. If the pairing is not completed (No in step S07), the controller 68 stops the process. The pairing and the authentication using BT may be performed not only after the self-propelled image forming apparatus 30 stops, but also before the self-propelled image forming apparatus 30 stops.

If the authentication unit 64 authenticates the user (Yes in step S08), the controller 68 changes the mode of the self-propelled image forming apparatus 30 to the handle mode (in step S09). When the user A operates the handle 42 so that a handle operation is detected, the controller 68 instructs the image forming unit 60 to start printing, and the image forming unit 60 starts printing in accordance with the print job which has been received in advance (in step S11). If an operation using the handle 42 has not been performed until a predetermined time elapses (No in step S10), the controller 68 stops the process. When the process is stopped, the controller 68 may cause an error message to be displayed on the operation unit 40.

Figure 13:
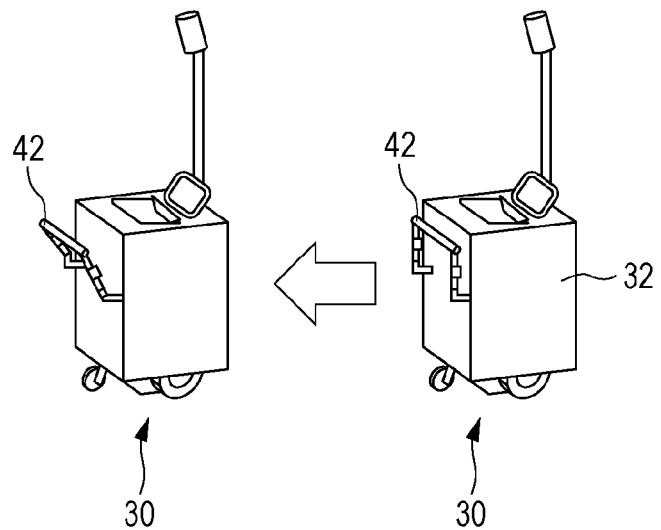
FIG. 13 is a diagram illustrating an exemplary operation of a self-propelled image forming apparatus according to the first exemplary embodiment.

In the handle mode, as illustrated on the left side in FIG. 13, the self-propelled image forming apparatus 30 may tilt the handle 42 forward of the housing 32 so as to prompt the user A to perform a handle operation. For example, a drive unit such as a motor for tilting the handle 42 is provided for the self-propelled image forming apparatus 30. The controller 68 controls the drive unit so that the handle 42 is tilted forward in the handle mode. In the traveling mode, the controller 68 controls the drive unit so that the handle 42 is kept parallel to the housing 32 of the self-propelled image forming apparatus 30.

According to the above-described first exemplary embodiment, since a handle operation of pulling the self-propelled image forming apparatus 30 toward a user causes printing to start, without a special operation performed by the user, an instruction to start printing is given through a simple operation.

The self-propelled image forming apparatus 30 may use BT to receive authentication information of the user A from the portable terminal 20 or a second mobile device of the user A, and the authentication unit 64 of the self-propelled image forming apparatus 30 or the authentication unit 104 of the server 100 may perform authentication on the basis of the authentication information. For example, the name, the user ID, and a password of the user A are used as the authentication information. When the self-propelled image forming apparatus 30 performs authentication, the communication unit 102 of the server 100 transmits registered authentication information associated with the MAC address of the portable terminal 20 which has transmitted the print job, via the network N and the communication control apparatus 12 to the self-propelled image forming apparatus 30. The authentication unit 64 of the self-propelled image forming apparatus 30 checks the authentication information obtained by using BT against the registered authentication information, thereby performing authentication. In the case where the server 100 performs authentication, the communication unit 62 of the self-propelled image forming apparatus 30 transmits the authentication information obtained by using BT, via the communication control apparatus 12 and the network N to the server 100. The authentication unit 104 of the server 100 checks the registered authentication information associated with the MAC address of the portable terminal 20 which has transmitted the print job, against the authentication information transmitted from the self-propelled image forming apparatus 30, thereby performing authentication. The communication unit 102 of the server 100 transmits the authentication result to the self-propelled image forming apparatus 30. If the user A is authenticated, the self-propelled image forming apparatus 30 executes the print job. If the user A is not authenticated, the self-propelled image forming apparatus 30 stops the process.

As described above, the registered authentication information associated with the MAC address of the portable terminal 20 which has transmitted a print job is used to specify the user of the portable terminal 20 which has transmitted the print job, causing the security to be ensured. That is, the MAC address is transmitted from the portable terminal 20 which has transmitted a print job, to the server 100, allowing the portable terminal 20 which has transmitted the print job to be specified in the server 100. A MAC address is associated with registered authentication information. Accordingly, authentication information obtained by the self-propelled image forming apparatus 30 using BT is checked against the registered authentication information associated with the MAC address of the portable terminal 20 which has transmitted the print job, whereby it is determined whether or not the user of the portable terminal 20 or a second mobile device which has transmitted the authentication information through BT matches the user of the portable terminal 20 which has transmitted the print job. This determination is performed by the authentication unit 104 of the server 100 or the authentication unit 64 of the self-propelled image forming apparatus 30. If the authentication information matches the registered authentication information, it is determined that the user of the portable terminal 20 or the second mobile device which has transmitted the authentication information through BT matches the user of the portable terminal 20 which has transmitted the print job. If the authentication information does not match the registered authentication information, it is determined that the user of the portable terminal 20 or the second mobile device which has transmitted the authentication information through BT does not match the user of the portable terminal 20 which has transmitted the print job. Thus, determination is performed as to whether or not the user of the portable terminal 20 or a second mobile device which has transmitted authentication information to the self-propelled image forming apparatus 30 matches the user of the portable terminal 20 which has transmitted a print job, causing the security to be ensured.

For example, the user A gives an instruction to execute a print job by using the portable terminal 20, and the user B having another portable terminal is present near the user A. In this case, a connection is established between the portable terminal of the user B and the self-propelled image forming apparatus 30 by using BT, and the authentication information of the user B is transmitted from the portable terminal of the user B to the self-propelled image forming apparatus 30. Even in this case, the registered authentication information associated with the MAC address of the portable terminal 20 of the user A is checked against the authentication information of the user B, so that the authentication fails and the print job is not executed. Thus, even when another user B is present near the user A, the user A who has given the instruction to perform a print job is distinguished from another user B. Printing is started in response to a handle operation performed by the user A who has given the instruction to execute a print job, causing the security to be ensured. That is, even when the user B operates the handle, the print job is not executed, causing the security to be ensured.

Second Exemplary Embodiment

Figure 14A:
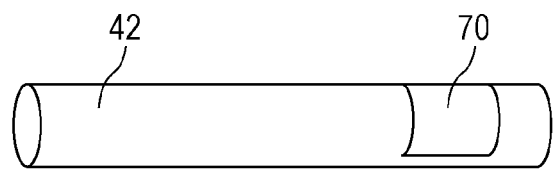
FIGS. 14A, 14B, and 14C are diagrams illustrating an exemplary configuration of a self-propelled image forming apparatus according to a second exemplary embodiment.
Figure 14B:
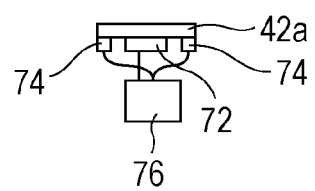

A second exemplary embodiment will be described with reference to FIGS. 14A to 15. In the second exemplary embodiment, authentication and charging are performed by using NFC. In the case where NFC is used, as illustrated in, for example, FIG. 14A, an NFC reading device 70 is disposed on the handle 42 of the self-propelled image forming apparatus 30. FIG. 14B illustrates a portion of the inside of the handle 42. The NFC reading device 70 includes an NFC antenna 72, light sources 74 such as a light-emitting diode (LED), and an NFC controller 76 connected to the NFC antenna 72 and the light sources 74. The NFC antenna 72 and the light sources 74 are disposed on a surface 42a in the handle 42. The NFC controller 76 outputs a signal received from the NFC antenna 72 to the authentication unit 64 illustrated in FIG. 10, and controls emission of light from the light sources 74. The NFC reading device 70 may be disposed at a position other than the handle 42 on the self-propelled image forming apparatus 30.

When charging is performed by using NFC, authentication information, such as a user name and a user ID, is registered in advance in a charging service. For example, authentication information of a user is registered in advance in the charging unit 110 of the server 100.

The processes performed by the self-propelled image forming apparatus 30 and the server 100 will be described with reference to the flowchart in FIG. 15. In the flowchart, the self-propelled image forming apparatus 30 has already moved to a position near the portable terminal 20 (user A), and the mode of the self-propelled image forming apparatus 30 has been switched to the handle mode.

After the mode is switched to the handle mode, if the user A operates the handle 42 so that a handle operation is detected (Yes in step S20), the controller 68 of the self-propelled image forming apparatus 30 changes the mode of the self-propelled image forming apparatus 30 to the NFC authentication mode (in step S21). If an operation using the handle 42 has not been performed until a predetermined time elapses (No in step S20), the controller 68 stops the process.

Figure 14C:
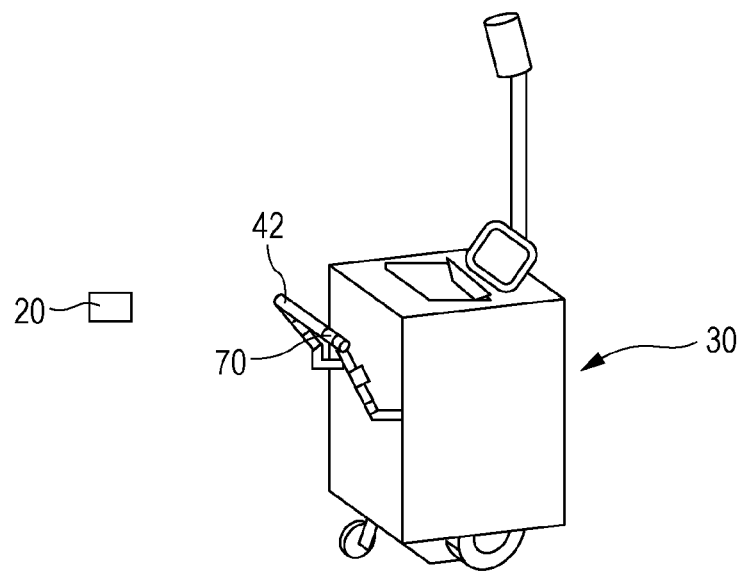
Figure 15:
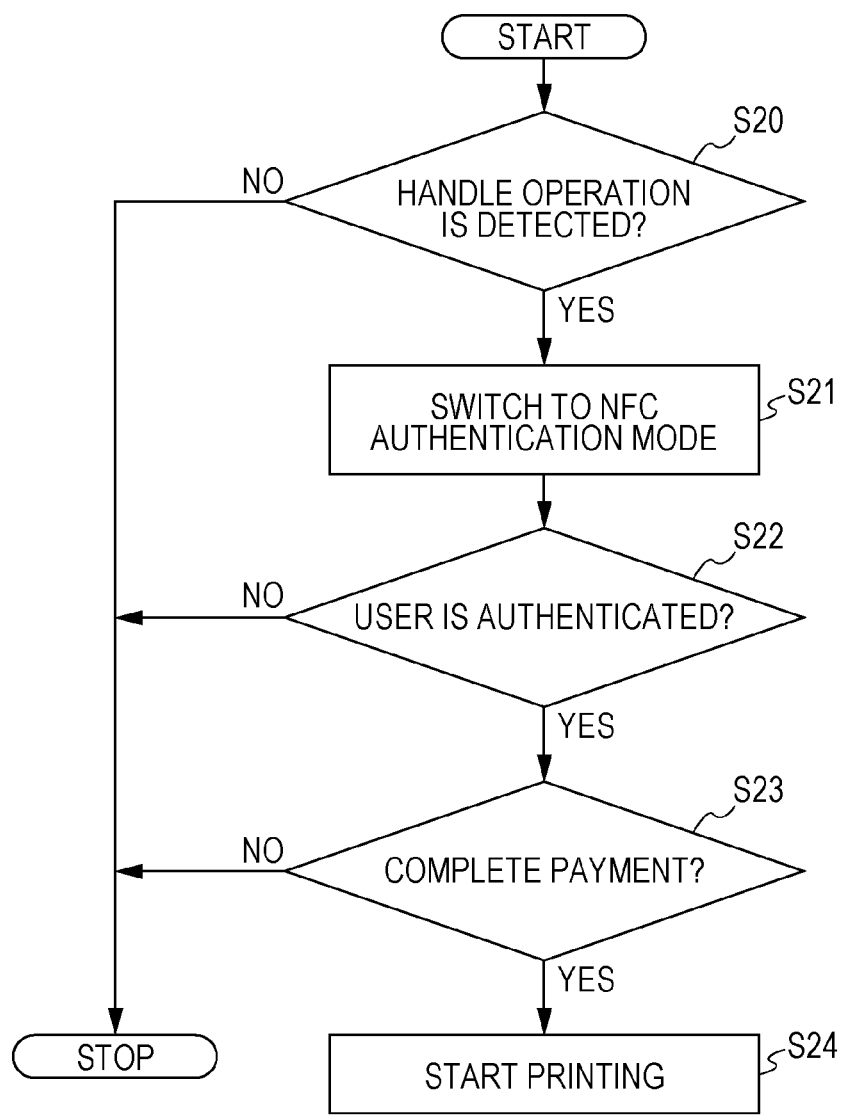
FIG. 15 is a flowchart of an exemplary operation of the self-propelled image forming apparatus according to the second exemplary embodiment.

For example, as illustrated in FIG. 14C, when the user A brings the portable terminal 20 or a second mobile device of the user A close to or into contact with the NFC reading device 70, the portable terminal 20 or the second mobile device transmits the authentication information of the user A to the self-propelled image forming apparatus 30. The self-propelled image forming apparatus 30 transmits the authentication information of the user A via the communication control apparatus 12 and the network N to the server 100.

The authentication unit 104 of the server 100 checks the registered authentication information associated with the MAC address of the portable terminal 20 which has transmitted the print job (i.e., the registered authentication information of the user A) against the authentication information transmitted from the self-propelled image forming apparatus 30, thereby performing authentication. The charging unit 110 of the server 100 checks the preregistered authentication information of the user A against the authentication information transmitted from the self-propelled image forming apparatus 30, thereby performing charging.

If the user A (portable terminal 20) is authenticated (Yes in step S22), and if the charging unit 110 completes payment (Yes in step S23), the communication unit 102 of the server 100 transmits information indicating the authentication result and the charging result via the network N and the communication control apparatus 12 to the self-propelled image forming apparatus 30. Thus, the controller 68 of the self-propelled image forming apparatus 30 instructs the image forming unit 60 to start printing, and the image forming unit 60 starts printing in accordance with the print job which has been received in advance (in step S24). If the user A is not authenticated (No in step S22), or if payment has not been completed (No in step S23), the controller 68 stops the process. When the user A is authenticated, the self-propelled image forming apparatus 30 may produce a sound or may cause a light source to emit light or blinking light. The authentication unit 64 of the self-propelled image forming apparatus 30 may perform authentication. The self-propelled image forming apparatus 30 may perform charging. When the process is stopped, controller 68 may cause an error message to be displayed on the operation unit 40.

When the mode is switched to the NFC authentication mode, the NFC controller 76 may cause the light sources 74 to emit light or blinking light. Thus, a user may be prompted to perform NFC authentication.

According to the above-described second exemplary embodiment, authentication is performed by using NFC, causing the security to be ensured. In addition, charging is performed by using NFC so that payment is easily made, improving the user convenience.

As another example, without performing charging by the charging unit 110, the self-propelled image forming apparatus 30 may start printing. As described above, when the self-propelled image forming apparatus 30 detects an operation using the handle 42, the controller 68 changes the mode of the self-propelled image forming apparatus 30 to the NFC authentication mode. The server 100 or the self-propelled image forming apparatus 30 uses NFC to perform authentication. When the user A is authenticated, the self-propelled image forming apparatus 30 starts printing. In this case, charging may be performed by means of cash after printing.

As yet another example, authentication using BT and charging using NFC may be combined. In this case, the self-propelled image forming apparatus 30 or the server 100 uses BT to perform authentication. When the user A is authenticated, the controller 68 changes the mode of the self-propelled image forming apparatus 30 to the handle mode. When the self-propelled image forming apparatus 30 detects an operation using the handle 42, the controller 68 switches the mode of the self-propelled image forming apparatus 30 to the NFC authentication mode. At that time, authentication using NFC is not performed, and the charging unit 110 performs charging on the basis of authentication information of the user A. When the charging unit 110 completes payment, the self-propelled image forming apparatus 30 starts printing.

Alternatively, after authentication and charging are completed, when the self-propelled image forming apparatus 30 detects an operation using the handle 42, the self-propelled image forming apparatus 30 may start printing.

Third Exemplary Embodiment

A third exemplary embodiment will be described with reference to FIGS. 16A to 18. In the third exemplary embodiment, biological information of a user is used to perform authentication. Examples of authentication using biological information include vein authentication using a vein pattern of a user and fingerprint authentication using a fingerprint of a user.

Figure 16A:
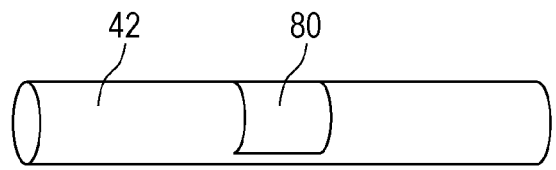
FIGS. 16A and 16B are diagrams illustrating an exemplary configuration of a self-propelled image forming apparatus according to a third exemplary embodiment.
Figure 16B:
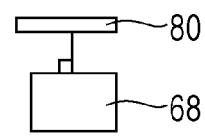

In the case where vein authentication is used, for example, as illustrated in FIG. 16A, a vein reading device 80 is disposed on the surface of the handle 42 of the self-propelled image forming apparatus 30. As illustrated in FIG. 16B, the vein reading device 80 is connected to the controller 68 of the self-propelled image forming apparatus 30. The vein reading device 80 reads out the vein pattern of a hand of a user, and outputs the vein information to the controller 68. The vein information is output to the authentication unit 104 of the server 100 or the authentication unit 64 of the self-propelled image forming apparatus 30. Thus, by disposing the vein reading device 80 on the handle 42, the vein reading device 80 reads out vein information of a user in response to an operation using the handle 42 performed by the user.

Figure 17A:
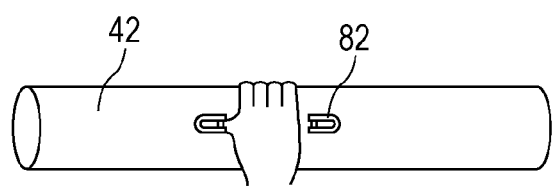
FIGS. 17A and 17B are diagrams illustrating an exemplary configuration of the self-propelled image forming apparatus according to the third exemplary embodiment.
Figure 17B:
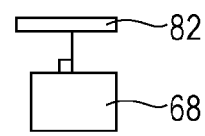

In the case where fingerprint authentication is used, for example, as illustrated in FIG. 17A, a fingerprint reading device 82 is disposed on the surface of the handle 42 of the self-propelled image forming apparatus 30. As illustrated in FIG. 17B, the fingerprint reading device 82 is connected to the controller 68 of the self-propelled image forming apparatus 30. The fingerprint reading device 82 reads out the fingerprint of a finger of a user, and outputs the fingerprint information to the controller 68. The fingerprint information is output to the authentication unit 104 of the server 100 or the authentication unit 64 of the self-propelled image forming apparatus 30. A marking or a guide may be provided on the surface of the handle 42 so that a thumb or the like of a user is put at the position of the fingerprint reading device 82. Thus, by disposing the fingerprint reading device 82 on the handle 42, the fingerprint reading device 82 reads out fingerprint information of a user in response to an operation using the handle 42 performed by the user.

The vein information and the fingerprint information of a user are registered in advance in the server 100 in such a manner as to be associated with the MAC address of the portable terminal 20. In the case where charging is performed by using biological information, such as vein information or fingerprint information, the biological information is registered in advance, for example, in the charging unit 110 of the server 100.

Figure 18:
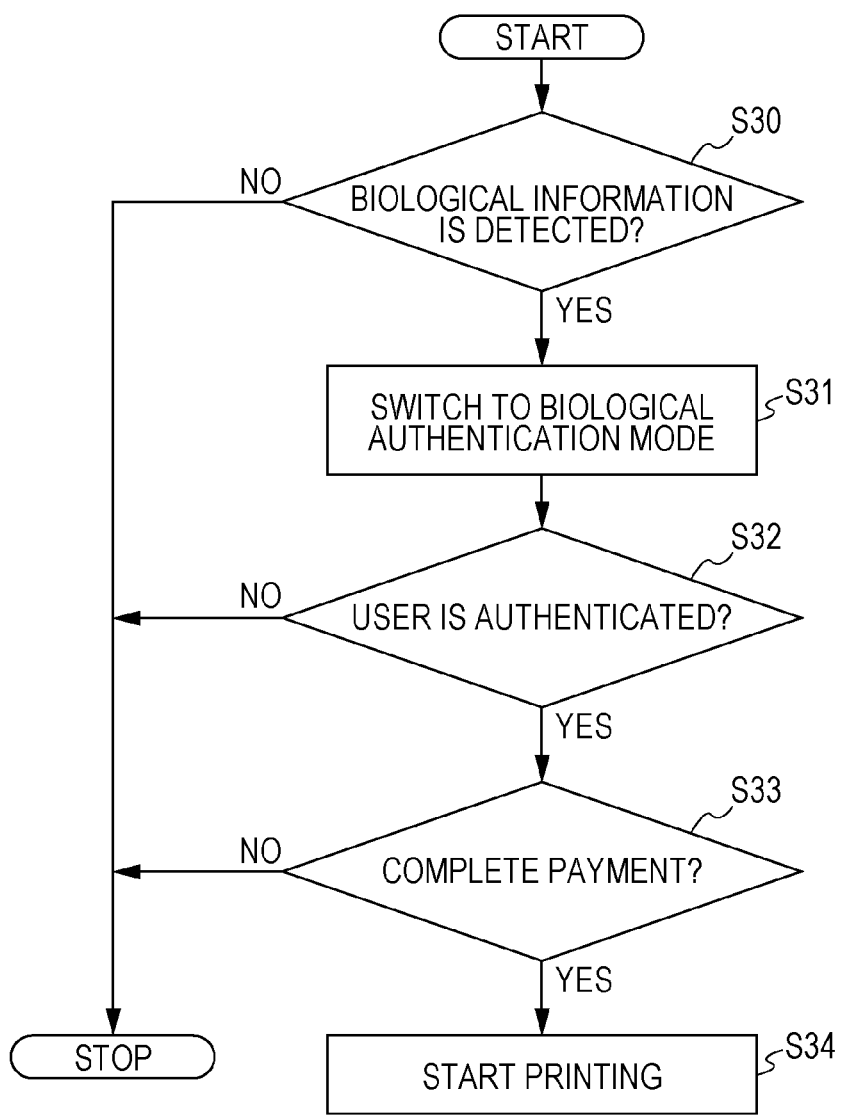
FIG. 18 is a flowchart of an exemplary operation of the self-propelled image forming apparatus according to the third exemplary embodiment.

The processes performed by the self-propelled image forming apparatus 30 and the server 100 will be described with reference to the flowchart in FIG. 18. In the flowchart, the self-propelled image forming apparatus 30 has already moved to a position near the portable terminal 20 (user A), and the mode of the self-propelled image forming apparatus 30 has been switched to the handle mode.

In the case where vein authentication is used, when the user A operates the handle 42 by using his/her hand, the vein reading device 80 illustrated in FIG. 16A reads out the vein pattern of a hand of the user A. If the vein pattern of the user A is detected (Yes in step S30), the controller 68 changes the mode of the self-propelled image forming apparatus 30 to the biological authentication mode (in step S31). If a vein pattern has not been read out until a predetermined time elapses (No in step S30), the controller 68 stops the process. The case in which fingerprint authentication is used is similar to the case of vein authentication. When the fingerprint reading device 82 illustrated in FIG. 17A reads out a fingerprint of the user A, the controller 68 changes the mode of the self-propelled image forming apparatus 30 to the biological authentication mode. Description will be made below by taking vein authentication as an example. In the case where fingerprint authentication is used, the same process is also performed.

When the vein reading device 80 reads out a vein pattern of the user A, the communication unit 62 of the self-propelled image forming apparatus 30 transmits the vein information of the user A via the communication control apparatus 12 and the network N to the server 100.

The authentication unit 104 of the server 100 checks the registered authentication information (registered vein information of the user A) associated with the MAC address of the portable terminal 20 which has transmitted the print job against the vein information transmitted from the self-propelled image forming apparatus 30, thereby performing authentication. The charging unit 110 of the server 100 checks the registered vein information of the user A which is registered in advance against the vein information transmitted from the self-propelled image forming apparatus 30, thereby performing charging.

If the user A is authenticated (Yes in step S32), and if the charging unit 110 completes payment (Yes in step S33), the communication unit 102 of the server 100 transmits information indicating the authentication result and the charging result, via the network N and the communication control apparatus 12 to the self-propelled image forming apparatus 30. Thus, the controller 68 of the self-propelled image forming apparatus 30 instructs the image forming unit 60 to start printing, and the image forming unit 60 starts printing in accordance with the print job which has been received in advance (in step S34). If the user is not authenticated (No in step S32), or if payment has not been completed (No in step S33), the controller 68 stops the process. The authentication unit 64 of the self-propelled image forming apparatus 30 may perform authentication by using the vein information. The self-propelled image forming apparatus 30 may perform charging. If the process is stopped, the controller 68 may cause an error message to be displayed on the operation unit 40.

According to the third exemplary embodiment, in a handle operation of pulling the self-propelled image forming apparatus 30 toward a user, biological information is read out and authentication is performed. In addition, an instruction to start printing is given. Thus, the user convenience is improved. Other than vein authentication and fingerprint authentication, any authentication using biological information, such as face authentication, retina authentication, iris authentication, voice spectrum authentication, or blink authentication (authentication method of measuring a change in the iris area of an eye due to blinking) may be applied to the third exemplary embodiment.

By using the registered authentication information (registered biological information, such as vein information or fingerprint information of a user) associated with the MAC address of the portable terminal 20 which has transmitted a print job, the user of the portable terminal 20 which has transmitted the print job is specified, improving the security. That is, registered biological information is associated to a MAC address. Therefore, biological information which is read out by the self-propelled image forming apparatus 30 is checked against registered biological information associated with the MAC address of the portable terminal 20 which has transmitted a print job, whereby it is determined whether or not the user whose biological information is read out by the self-propelled image forming apparatus 30 matches the user of the portable terminal 20 which has transmitted the print job. When the biological information matches the registered biological information, it is determined that the user whose biological information is read out by the self-propelled image forming apparatus 30 matches the user of the portable terminal 20 which has transmitted the print job. When the biological information does not match the registered biological information, it is determined that the user whose biological information is read out does not match the user of the portable terminal 20 which has transmitted the print job. Thus, determination is performed as to whether or not the user whose biological information is read out by the self-propelled image forming apparatus 30 matches the user of the portable terminal 20 which has transmitted a print job, causing the security to be ensured. Therefore, if another person who has not given a print job performs a handle operation, the person is not authenticated, and printing is not performed. Thus, even if another person performs a handle operation to give an instruction to start printing, printing is not performed, causing the security to be ensured.

For example, the user A uses the portable terminal 20 to give an instruction to execute a print job, and the user B who is not the user A operates the handle 42 of the self-propelled image forming apparatus 30. Then, biological information of the user B is read out by the self-propelled image forming apparatus 30. Even in this case, the registered biological information associated with the MAC address of the portable terminal 20 of the user A is checked against the biological information of the user B. Therefore, the authentication fails, and the print job is not executed. Thus, the user A who has given an instruction to execute a print job is distinguished from the user B, and printing is started in response to a handle operation of the user A who has given the instruction to execute a print job, causing the security to be ensured. That is, even if the user B operates the handle 42, the print job is not executed, causing the security to be ensured.

It is not always necessary to perform charging using biological information of a user. In this case, authentication is performed by using biological information, and charging is performed by using another method. For example, charging may be performed by using NFC used in the second exemplary embodiment or by means of cash. Alternatively, charging need not be performed.

Fourth Exemplary Embodiment

A fourth exemplary embodiment will be described with reference to FIGS. 19A to 20. In the fourth exemplary embodiment, a specific motion (gesture) of a user is used to control a self-propelled image forming apparatus.

Figure 19A:
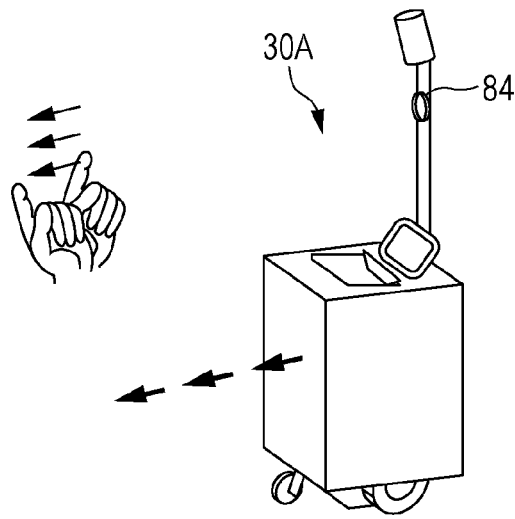
FIGS. 19A, 19B, and 19C are diagrams illustrating a configuration of a self-propelled image forming apparatus according to a fourth exemplary embodiment.
Figure 19B:
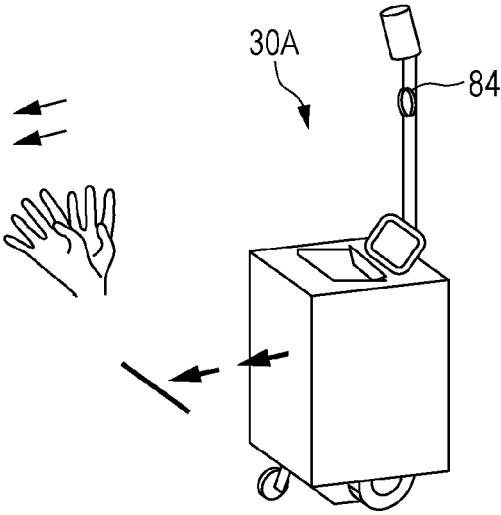
Figure 19C:
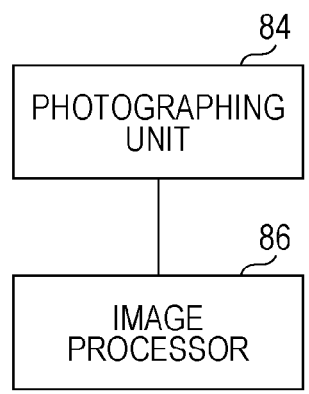
Figure 20:
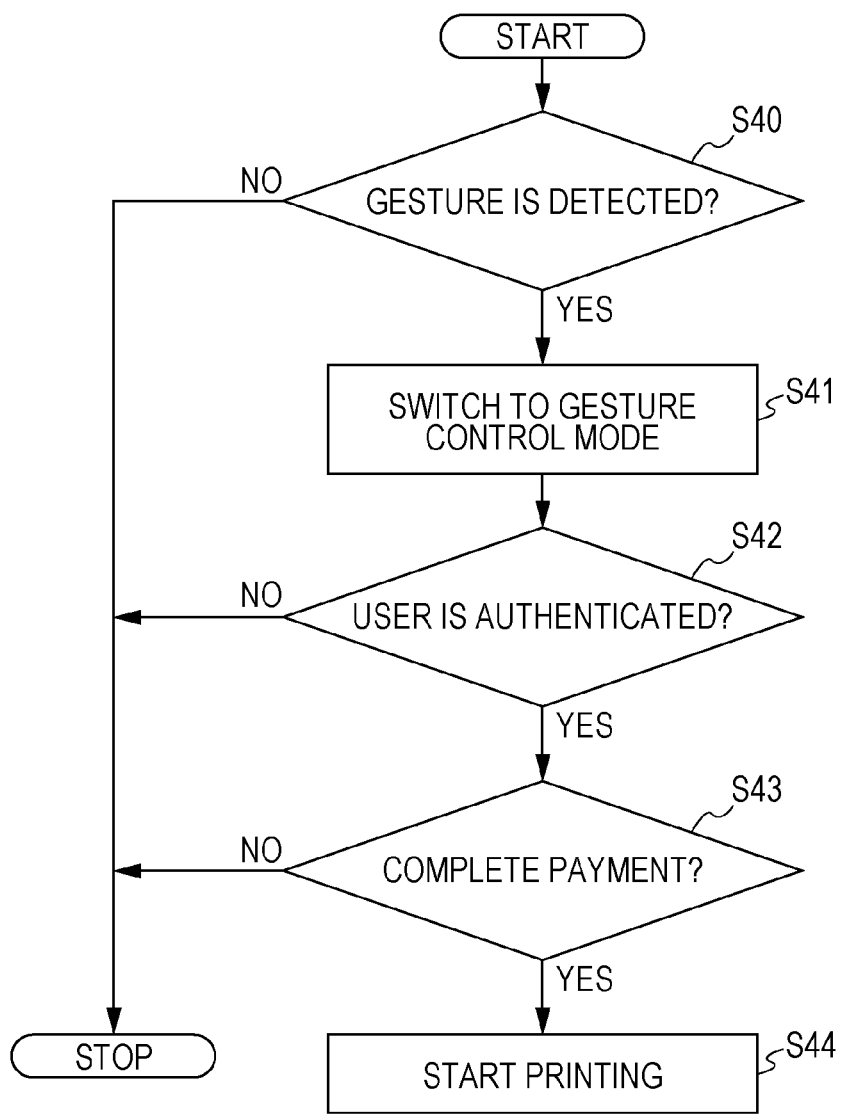
FIG. 20 is a flowchart of an exemplary operation of the self-propelled image forming apparatus according to the fourth exemplary embodiment.

As illustrated in FIGS. 19A and 19B, a self-propelled image forming apparatus 30A according to the fourth exemplary embodiment is different from the self-propelled image forming apparatus 30 illustrated in FIGS. 6A and 6B in that the handle 42 is not disposed on the housing 32. A photographing unit 84 such as a camera is disposed on the self-propelled image forming apparatus 30A. As illustrated in FIG. 19C, the self-propelled image forming apparatus 30A includes an image processor 86 connected to the photographing unit 84. Other than the configuration with respect to the handle 42, the photographing unit 84, and the image processor 86, the self-propelled image forming apparatus 30A has the same configuration as that of the self-propelled image forming apparatus 30.

The photographing unit 84 photographs an area surrounding the self-propelled image forming apparatus 30A, thereby generating image data, such as still image data or movie data of the surrounding area, which is output to the image processor 86. The image processor 86 analyzes the image data to detect a user motion. For example, a gesture is associated in advance with an instruction to the self-propelled image forming apparatus 30A, and dictionary information indicating the association is stored in advance in a memory (not illustrated). Examples of a gesture include a MOVE gesture, a STOP gesture, and a PRINT gesture. The MOVE gesture is a gesture in which, for example, a user moves his/her finger toward himself/herself and which causes the self-propelled image forming apparatus 30A to move in the direction indicated in the gesture. The STOP gesture is a gesture for stopping movement of the self-propelled image forming apparatus 30A. The PRINT gesture is a gesture for instructing the self-propelled image forming apparatus 30A to start printing. These various gestures are associated in advance with instructions to the self-propelled image forming apparatus 30A. The image processor 86 analyzes the image data to detect a gesture, specifies an instruction corresponding to the detected gesture, and outputs the instruction information indicating the instruction, to the controller 68. The controller 68 controls the units in the self-propelled image forming apparatus 30A in accordance with the instruction information. The photographing unit 84 corresponds to an exemplary detection unit which detects a user motion.

The processes performed by the self-propelled image forming apparatus 30A and the server 100 will be described with reference to the flowchart in FIG. 20. In the flowchart, the self-propelled image forming apparatus 30A has already moved to a position near the portable terminal 20 (user A).

After the self-propelled image forming apparatus 30A has moved to a position near the user A, when the user A is to move the self-propelled image forming apparatus 30A toward the user A, for example, as illustrated in FIG. 19A, the user A moves his/her finger in the direction toward the user A. In this case, the photographing unit 84 photographs the user A, and outputs image data to the image processor 86. The image processor 86 analyzes the image data generated by the photographing unit 84 so as to detect the motion of the finger of the user A, and specifies the gesture of the user A. In this case, the gesture of the user A is determined to be the MOVE gesture. If a gesture of the user A is detected (Yes in step S40), the controller 68 of the self-propelled image forming apparatus 30A changes the mode of the self-propelled image forming apparatus 30A to the gesture control mode (in step S41). If a gesture has not been detected until a predetermined time elapses (No in step S40), the controller 68 stops the process.

When the mode is switched to the gesture control mode, for example, the drive controller 46 illustrated in FIG. 7 drives the left wheel motor 48a and the right wheel motor 48b under the control of the controller 68 so as to cause the self-propelled image forming apparatus 30A to move toward the user A. As illustrated in FIG. 19B, in the case where the user A makes the STOP gesture, the image processor 86 determines that it is the STOP gesture, and the drive controller 46 stops movement of the self-propelled image forming apparatus 30A under the control of the controller 68.

If the user A is authenticated (Yes in step S42), and if the charging unit 110 completes payment (Yes in step S43), the image forming unit 60 starts printing in accordance with the print job which has been received in advance (in step S44). If the user A is not authenticated, (No in step S42), or if payment has not been completed (No in step S43), the controller 68 stops the process. When the process is stopped, the controller 68 may cause an error message to be displayed on the operation unit 40.

Authentication in step S42 may be performed on the basis of biological information of the user A or by using NFC. When biological information is used, a vein reading device or a fingerprint reading device may be disposed on the self-propelled image forming apparatus 30A. When NFC is used, an NFC reading device may be disposed on the self-propelled image forming apparatus 30A. Charging may be performed by using biological information of the user A or NFC. It is not always necessary to perform charging.

Face authentication may be used to authenticate the user A, or the user A may be authenticated on the basis of a gesture. In this case, image data of the face or the gesture of a user is stored in the server 100 in advance in such a manner as to be associated with the MAC address of the portable terminal 20. When the photographing unit 84 photographs the face or a gesture of the user A, the communication unit 62 of the self-propelled image forming apparatus 30A transmits image data of the face or the gesture of the user A via the communication control apparatus 12 and the network N to the server 100. The authentication unit 104 of the server 100 checks the registered image data (image data of the face or the gesture of the user A) associated with the MAC address of the portable terminal 20 which has transmitted a print job against the image data transmitted from the self-propelled image forming apparatus 30A, thereby performing authentication. In the case where authentication is performed on the basis of a gesture, authentication is performed on the basis of the gesture, and an instruction is given to the self-propelled image forming apparatus 30A. For example, making a gesture of pulling the self-propelled image forming apparatus 30A toward a user causes image data as authentication information to be generated, and authentication is performed. In addition, an instruction is given to the self-propelled image forming apparatus 30A. Alternatively, the self-propelled image forming apparatus 30A may perform authentication.

When charging is performed by using the face or a gesture of a user, for example, the face or the gesture of the user is stored in the charging unit 110 of the server 100 in advance. The charging unit 110 of the server 100 checks the preregistered image data of the user A against the image data transmitted from the self-propelled image forming apparatus 30A, thereby performing charging. Alternatively, the self-propelled image forming apparatus 30A may perform charging.

When the PRINT gesture made by the user A is detected, the self-propelled image forming apparatus 30A may start printing. For example, after the PRINT gesture is detected, when authentication and charging are completed, the self-propelled image forming apparatus 30A may start printing.

After authentication and charging are completed, when the PRINT gesture is detected, the self-propelled image forming apparatus 30A may start printing. When a user is authenticated on the basis of the PRINT gesture, the self-propelled image forming apparatus 30A may start printing. In this case, authentication is performed by using the PRINT gesture, and an instruction to start printing is given.

According to the above-described fourth exemplary embodiment, the self-propelled image forming apparatus 30A is instructed through a gesture of a user. Accordingly, through an intuitive operation performed by a user, the self-propelled image forming apparatus 30A is pulled toward the user, and an instruction to start printing is given, improving the user convenience. When authentication is performed by using biological information of a user, the security is improved, and payment is made in a simple manner through charging.

The above-described gesture may be made by using not only a finger of a user but also a palm. In addition, for example, a motion of an arm or the head may be used. Alternatively, the photographing unit 84 photographs the appearance of a user, and authentication and charging may be performed on the basis of the generated image data. Similarly to the self-propelled image forming apparatus 30 illustrated in FIGS. 6A and 6B, the handle 42 may be disposed on the self-propelled image forming apparatus 30A.

Fifth Exemplary Embodiment

A fifth exemplary embodiment will be described with reference to FIGS. 21A to 22. In the fifth exemplary embodiment, a voice of a user is used to control operations of a self-propelled image forming apparatus and perform authentication.

Figure 21A:
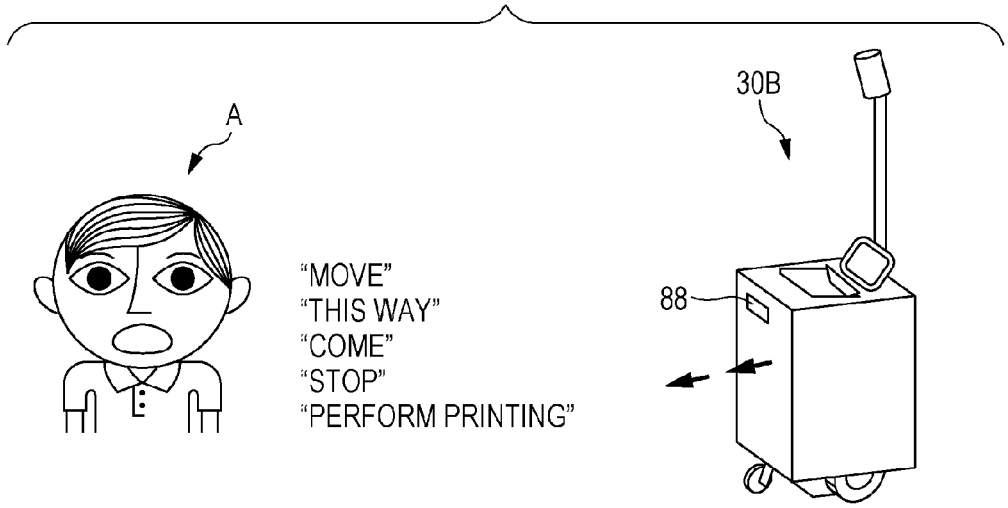
FIGS. 21A and 21B are diagrams illustrating an exemplary configuration of a self-propelled image forming apparatus according to a fifth exemplary embodiment.
Figure 21B:
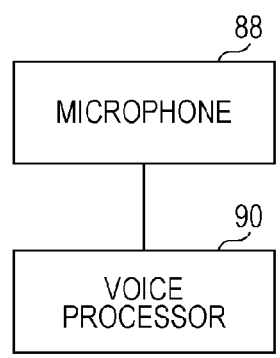
Figure 22:
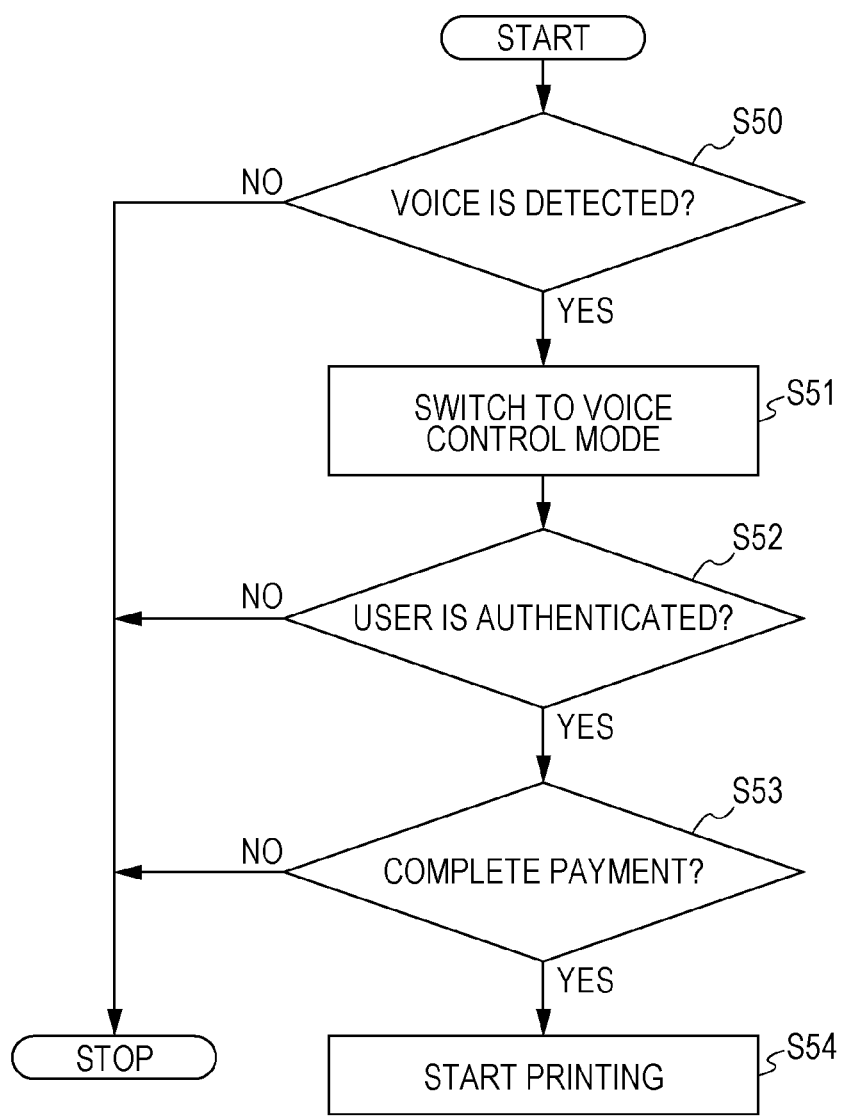
FIG. 22 is a flowchart of an exemplary operation of the self-propelled image forming apparatus according to the fifth exemplary embodiment.

As illustrated in FIG. 21A, a self-propelled image forming apparatus 30B according to the fifth exemplary embodiment is different from the self-propelled image forming apparatus 30 illustrated in FIGS. 6A and 6B in that the handle 42 is not disposed on the housing 32. A directional microphone 88 is disposed on the front of the housing 32 of the self-propelled image forming apparatus 30B. As illustrated in FIG. 21B, the self-propelled image forming apparatus 30B includes a voice processor 90 connected to the microphone 88. Other than the configuration with respect to the handle 42, the microphone 88, and the voice processor 90, the self-propelled image forming apparatus 30B has the same configuration as that of the self-propelled image forming apparatus 30.

The microphone 88 picks up a voice of the user A, converts the voice into a voice signal, and outputs the voice signal to the voice processor 90. The voice processor 90 specifies an instruction of the user A by performing voice recognition on the basis of the voice signal. For example, a voice is associated in advance with an instruction to the self-propelled image forming apparatus 30B, and dictionary information indicating the association is stored in a memory (not illustrated) in advance. Examples of the type of a voice include "Move", "This way", "Come", "Halt", "Stop", and "Perform printing". "This way" or "Come" is a voice for moving the self-propelled image forming apparatus 30B toward the place from which the voice is heard. "Halt" or "Stop" is a voice for stopping movement of the self-propelled image forming apparatus 30B. "Perform printing" is a voice for instructing the self-propelled image forming apparatus 30B to start printing. These various voices are associated in advance with instructions to the self-propelled image forming apparatus 30B. The voice processor 90 analyzes the voice signal to specify an instruction corresponding to the voice, and outputs instruction information corresponding to the instruction, to the controller 68. The controller 68 controls the units in the self-propelled image forming apparatus 30B in accordance with the instruction information. The microphone 88 corresponds to an exemplary detection unit which detects a user voice.

The voice signal is output to the authentication unit 104 of the server 100 or the authentication unit 64 of the self-propelled image forming apparatus 30B. The voice signal of a user is stored in the server 100 in advance in such a manner as to be associated with the MAC address of the portable terminal 20. In the case where charging is performed by using the voice signal, for example, the voice signal is registered in the charging unit 110 of the server 100 in advance.

The processes performed by the self-propelled image forming apparatus 30B and the server 100 will be described with reference to the flowchart in FIG. 22. In the flowchart, the self-propelled image forming apparatus 30B has already moved to a position near the portable terminal 20 (user A).

After the self-propelled image forming apparatus 30B has moved to a position near the user A, when the user A is to move the self-propelled image forming apparatus 30B toward the user A, the user A utters a voice such as "This way". In this case, the microphone 88 picks up the voice of the user A, and outputs the voice signal to the voice processor 90. The voice processor 90 analyzes the voice signal generated by the microphone 88 so as to specify the meaning of the voice of the user A (an instruction to the self-propelled image forming apparatus 30B). In this case, the voice "This way" of the user A is determined to be a voice for moving the self-propelled image forming apparatus 30B toward the place from which the voice is heard. If a voice of the user A is detected (Yes in step S50), the controller 68 of the self-propelled image forming apparatus 30B changes the mode of the self-propelled image forming apparatus 30B to the voice control mode (in step S51). If a voice has not been detected until a predetermined time elapses (No in step S50), the controller 68 stops the process.

When the mode is switched to the voice control mode, for example, the drive controller 46 illustrated in FIG. 7 drives the left wheel motor 48a and the right wheel motor 48b under the control of the controller 68 so as to cause the self-propelled image forming apparatus 30B to move toward the place from which the voice "This way" is heard. When the user A utters a voice for instructing the self-propelled image forming apparatus 30B to stop, such as "Halt", the voice processor 90 recognizes the voice, and the drive controller 46 stops movement of the self-propelled image forming apparatus 30B under the control of the controller 68. The drive controller 46 may change the moving speed of the self-propelled image forming apparatus 30B in accordance with the magnitude of a voice. For example, the drive controller 46 may increase the moving speed as the voice becomes louder.

When the microphone 88 detects a voice of the user A, the communication unit 62 of the self-propelled image forming apparatus 30B transmits the voice signal of the user A via the communication control apparatus 12 and the network N to the server 100.

The authentication unit 104 of the server 100 checks the registered authentication information (registered voice signal of the user A) associated with the MAC address of the portable terminal 20 which has transmitted the print job against the voice signal transmitted from the self-propelled image forming apparatus 30B, thereby performing authentication. The charging unit 110 of the server 100 checks the preregistered voice signal of the user A against the voice signal transmitted from the self-propelled image forming apparatus 30B, thereby performing charging. Thus, even in the case where multiple users are present, when the microphone 88 detects voices of some users, the user A who has given an instruction to execute a print job is specified.

If the user A is authenticated (Yes in step S52), and if the charging unit 110 completes payment (Yes in step S53), the communication unit 102 of the server 100 transmits information indicating the authenticated result and the charging result via the network N and the communication control apparatus 12 to the self-propelled image forming apparatus 30B. Thus, the controller 68 of the self-propelled image forming apparatus 30B instructs the image forming unit 60 to start printing, and the image forming unit 60 starts printing in accordance with the print job which has been received in advance (in step S54). If the user A is not authenticated (No in step S52), or if payment has not been completed (No in step S53), the controller 68 stops the process. When the process is stopped, the controller 68 may cause an error message to be displayed on the operation unit 40. The authentication unit 64 of the self-propelled image forming apparatus 30B may perform authentication by using the voice signal. The self-propelled image forming apparatus 30B may perform charging.

When a voice for giving an instruction to start printing is detected, the self-propelled image forming apparatus 30B may start printing. For example, after a voice for giving an instruction to start printing is detected, when authentication and charging are completed, the self-propelled image forming apparatus 30B may start printing. After authentication and charging are completed, when a voice for giving an instruction to start printing is detected, the self-propelled image forming apparatus 30B may start printing. When a user is authenticated on the basis of a voice for giving an instruction to start printing, the self-propelled image forming apparatus 30B may start printing. In this case, authentication is performed by using a voice for giving an instruction to start printing, and an instruction to start printing is given.

Authentication may be performed on the basis of vein information or fingerprint information of the user A, or by using NFC. In the case where vein information or fingerprint information is used, a vein reading device or a fingerprint reading device may be disposed on the self-propelled image forming apparatus 30B. In the case where NFC is used, an NFC reading device may be disposed on the self-propelled image forming apparatus 30B. Charging may be performed by using vein information or fingerprint information of the user A, or by using NFC. It is not always necessary to perform charging.

According to the above-described fifth exemplary embodiment, the self-propelled image forming apparatus 30B is instructed through a voice of a user. Accordingly, through an intuitive operation performed by a user, the self-propelled image forming apparatus 30B is pulled toward the user, and an instruction to start printing is given, improving the user convenience. Authentication is performed by using a voice of a user, whereby the user who has instructed a printer is specified, causing the security to be ensured.

Similarly to the self-propelled image forming apparatus 30 illustrated in FIGS. 6A and 6B, the handle 42 may be disposed on the self-propelled image forming apparatus 30B.

The above-described first to fifth exemplary embodiments may be combined in any manner. For example, an exemplary embodiment may be implemented in which a unit for pulling a self-propelled image forming apparatus toward a user and authentication information used to authenticate the user are combined in any manner.

The above-described exemplary embodiments may be applied to a self-propelled work apparatus other than the self-propelled image forming apparatus, such as a self-propelled delivery apparatus which delivers food or drink to a user by moving by itself in a cafe or the like. In this case, the self-propelled delivery apparatus moves by itself to a position near a user, is pulled toward the user from the position near the user in accordance with an operation of the user, and starts a predetermined operation. The operation corresponds to, for example, provision of food or drink which has been carried, to a user. The above-described exemplary embodiments may be applied to an operation in which medical devices are delivered to an operator by moving by itself in an operating room, or to an operation in which parts are delivered to a person in charge by moving itself in a factory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A self-propelled work apparatus comprising:
a driving mechanism configured to move in a self-propelled manner to a position near a user;
device configured to perform predetermined work; and
a user interface configured to adjust a position of the driving mechanism located near the user, in accordance with a motion of the user,
wherein the device starts the predetermined work when the user interface is activated in accordance with the user motion,
wherein the user interface comprises a handle configured to perform an operation of moving the device, and
wherein the handle projects from a housing of the apparatus.

2. The self-propelled work apparatus according to claim 1, further comprising:
an authentication information acquirer configured to acquire authentication information of the user in response to the user motion for adjusting the position of the driving mechanism located near the user,
wherein the device starts the predetermined work when the user interface is activated in accordance with the user motion, and then the user is authenticated on the basis of the acquired authentication information by the authentication information acquirer.

3. The self-propelled work apparatus according to claim 2, wherein, when the user is authenticated on the basis of authentication information associated with identification information for uniquely identifying a terminal which was used by the user to give an instruction to perform work, the device starts the work indicated in the instruction.

4. The self-propelled work apparatus according to claim 1, wherein, when the user is authenticated on the basis of authentication information associated with identification information for uniquely identifying a terminal which was used by the user to give an instruction to perform work, the device starts the work indicated in the instruction.

5. The self-propelled work apparatus according to claim 1, wherein the device starts the predetermined work when the operation using the handle performed by the user is detected.

6. The self-propelled work apparatus according to claim 5, further comprising:
a biological information reader disposed on the handle and that is configured to read out biological information of the user;
wherein, when the operation using the handle performed by the user is detected, and then the user is authenticated on the basis of the biological information of the user which is read out by the biological information reader, the device starts the predetermined work.

7. The self-propelled work apparatus according to claim 1, wherein the user interface is a motion detector configured to detect a motion of the user, and
wherein the device starts the predetermined work when the motion detector detects a motion of the user which indicates an instruction to start the work.

8. The self-propelled work apparatus according to claim 7, wherein, when the motion detector detects the motion of the user which indicates an instruction to start the work, and then the user is authenticated on the basis of authentication information which is obtained in response to the user motion and which is represented by the user motion, the device starts the predetermined work.

9. The self-propelled work apparatus according to claim 1, wherein the user interface comprises a voice detector configured to detect a voice of the user, and
wherein the device starts the predetermined work when the voice detector detects a voice of the user which indicates an instruction to start the work.

10. The self-propelled work apparatus according to claim 9, wherein, when the voice detector detects the voice of the user which indicates an instruction to start the work, and then the user is authenticated on the basis of authentication information which is obtained in response to the user voice and which is represented by the user voice, the device starts the predetermined work.

11. The self-propelled work apparatus according to claim 1, further comprising:
an authentication information acquirer configured to acquire authentication information of the user by using near field communication,
wherein, when the user interface is activated in accordance with the user motion, and then the user is authenticated on the basis of the authentication information acquired by the authentication information acquirer.

12. The self-propelled work apparatus according to claim 1,
wherein the device starts the predetermined work when charging is further performed on the basis of authentication information of the user.

13. The self-propelled work apparatus according to claim 1, wherein the handle comprises a first pressure sensor and a second pressure sensor.

14. The self-propelled work apparatus according to claim 13, wherein the driving mechanism moves in a direction determined based on a signal from the first pressure sensor and a signal from the second pressure sensor.

15. The self-propelled work apparatus according to claim 14, wherein the driving mechanism applies a rotation direction and a torque for a left wheel motor and a right wheel motor based on the signal from the first pressure sensor and the signal from the second pressure sensor.

16. A non-transitory computer readable medium storing a program causing a computer to execute a process comprising:
controlling a traveling device which moves in a self-propelled manner to a position near a user;
controlling a work device which performs predetermined work;
adjusting a position of the traveling device located near the user, in accordance with a motion of the user; and
causing the work device to start the predetermined work when the adjusting is performed in accordance with the user motion,
wherein the adjusting the position is performed using a handle configured to perform an operation of moving the device, and
wherein the handle projects from a housing of the traveling device.

17. A method comprising:
controlling a traveling device which moves in a self-propelled manner to a position near a user;
controlling a work device which performs predetermined work;
adjusting a position of the traveling device located near the user, in accordance with a motion of the user; and
causing the work device to start the predetermined work when the adjusting is performed in accordance with the user motion,
wherein the adjusting the position is performed using a handle configured to perform an operation of moving the device, and
wherein the handle projects from a housing of the traveling device.

* * * * *